(12) United States Patent
Yamashita et al.

(10) Patent No.: US 9,214,112 B2
(45) Date of Patent: Dec. 15, 2015

(54) DISPLAY DEVICE AND DISPLAY METHOD

(75) Inventors: Haruo Yamashita, Osaka (JP); Takeshi Ito, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 243 days.

(21) Appl. No.: 13/395,842

(22) PCT Filed: Sep. 29, 2010

(86) PCT No.: PCT/JP2010/005873
§ 371 (c)(1),
(2), (4) Date: Mar. 13, 2012

(87) PCT Pub. No.: WO2011/040021
PCT Pub. Date: Apr. 7, 2011

(65) Prior Publication Data
US 2012/0169792 A1 Jul. 5, 2012

(30) Foreign Application Priority Data

Sep. 29, 2009 (JP) ................................. 2009-223980

(51) Int. Cl.
*G09G 3/34* (2006.01)
*G02F 1/1335* (2006.01)
(Continued)

(52) U.S. Cl.
CPC ............ *G09G 3/3426* (2013.01); *G02F 1/1336* (2013.01); *G02F 2001/133601* (2013.01);
(Continued)

(58) Field of Classification Search
CPC ................ G09G 2320/0233; G09G 2320/029; G09G 2320/2095; G09G 2320/0646; G09G 3/2007; G09G 3/3406; G09G 3/342; G09G 3/3426; G09G 3/3696
USPC ....................... 345/204, 690, 694, 87, 89, 102
See application file for complete search history.

(56) References Cited

U.S. PATENT DOCUMENTS 7,460,103 B2    12/2008 Konno et al.
8,358,293 B2 *   1/2013 Seo et al. ....................... 345/204
(Continued)

FOREIGN PATENT DOCUMENTS

CN    101021999    8/2007
CN    101325646    12/2008
(Continued)

OTHER PUBLICATIONS

Chen et al. "Locally pixel-compensated backlight dimming on LED-backlit LCD TV" Journal of the SID 15/12, 2007 pp. 981-987.*

*Primary Examiner* — Ilana Spar
(74) *Attorney, Agent, or Firm* — Hamre, Schumann, Mueller & Larson, P.C.

(57) ABSTRACT

Disclosed is a display device capable of compensating unevenness in brightness caused by physical restrictions of a display device or degradation in image quality caused by a partial reduction in contrast occurring in the local dimming technology using human visual characteristics. A liquid crystal panel (101) modulates illuminating light in accordance with the transmittance, and displays images on a screen. A backlight (102) emits the illuminating light to the liquid crystal panel (101) such that amounts of the illuminating light differ for each light emitting area of the screen. A backlight control unit (106) controls emission brightness of the backlight (102) for each light emitting area. A local gradation converting unit (104) performs gradation conversion on an image signal, and acquires a brightness value for each pixel after the conversion. A backlight driving unit (107) controls the transmittance for each pixel on the basis of the acquired brightness values after the conversion. The local gradation converting unit sets conversion characteristics for pixels to be processed in the image signal such that the brightness values of the pixels to be processed are low as the lightness of the periphery of the pixels to be processed is high, and performs gradation conversion using the set conversion characteristics.

14 Claims, 13 Drawing Sheets

(51) Int. Cl.
*G09G 3/20* (2006.01)
*G09G 3/36* (2006.01)

(52) U.S. Cl.
CPC ............ *G09G3/2051* (2013.01); *G09G 3/3611* (2013.01); *G09G 2310/0232* (2013.01); *G09G 2320/0233* (2013.01); *G09G 2320/0238* (2013.01); *G09G 2320/0646* (2013.01); *G09G 2360/16* (2013.01)

(56) References Cited

U.S. PATENT DOCUMENTS

| | | | |
|---|---|---|---|
| 2002/0006231 A1* | 1/2002 | Jayant et al. | 382/266 |
| 2005/0184952 A1 | 8/2005 | Konno et al. | |
| 2005/0212726 A1 | 9/2005 | Namba et al. | |
| 2007/0285379 A1 | 12/2007 | Jung et al. | |
| 2008/0042927 A1 | 2/2008 | Jung et al. | |
| 2008/0186272 A1 | 8/2008 | Huang et al. | |
| 2008/0310752 A1 | 12/2008 | Han et al. | |
| 2009/0097775 A1 | 4/2009 | Monobe et al. | |
| 2009/0161972 A1* | 6/2009 | Sekiguchi et al. | 382/233 |
| 2009/0184917 A1 | 7/2009 | Park et al. | |
| 2010/0020094 A1* | 1/2010 | Park et al. | 345/589 |
| 2011/0109765 A1 | 5/2011 | Monobe et al. | |

FOREIGN PATENT DOCUMENTS

| | | |
|---|---|---|
| CN | 101427559 | 5/2009 |
| EP | 2003614 | 12/2008 |
| JP | 2002-099250 | 4/2002 |
| JP | 2005-258403 | 9/2005 |
| JP | 2006-129105 | 5/2006 |
| JP | 2007-312349 | 11/2007 |
| JP | 2009-271104 | 11/2009 |

* cited by examiner

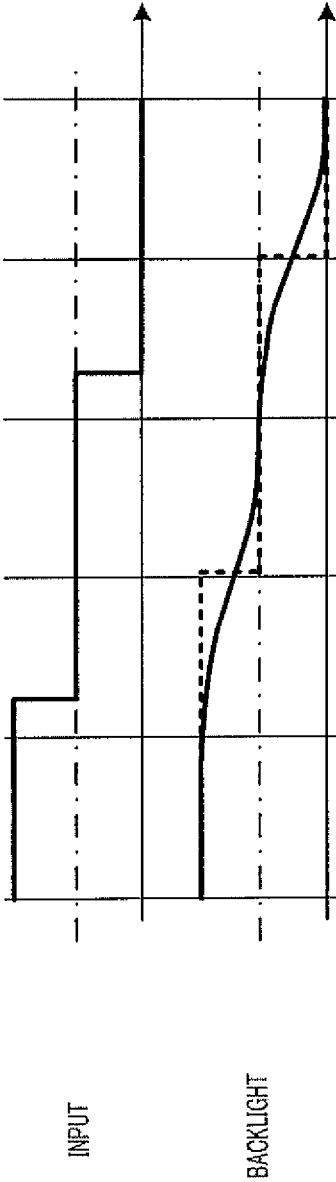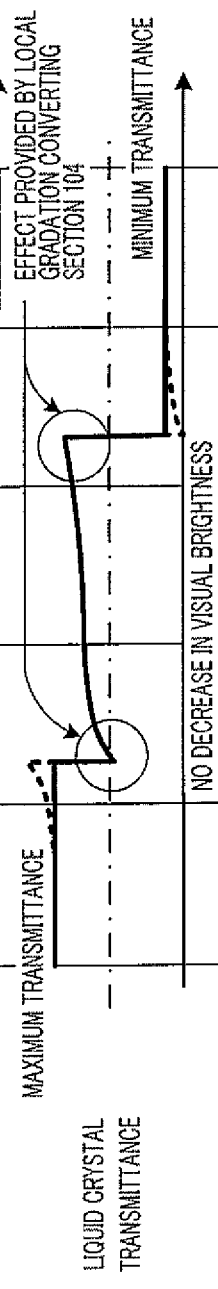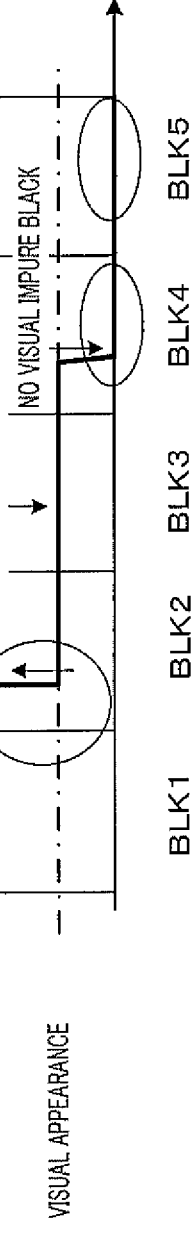

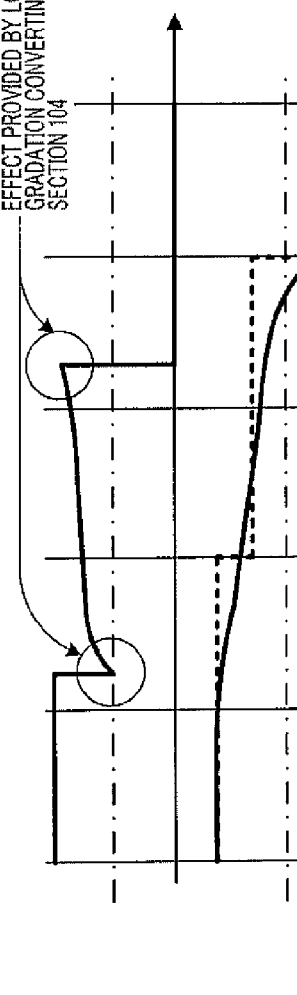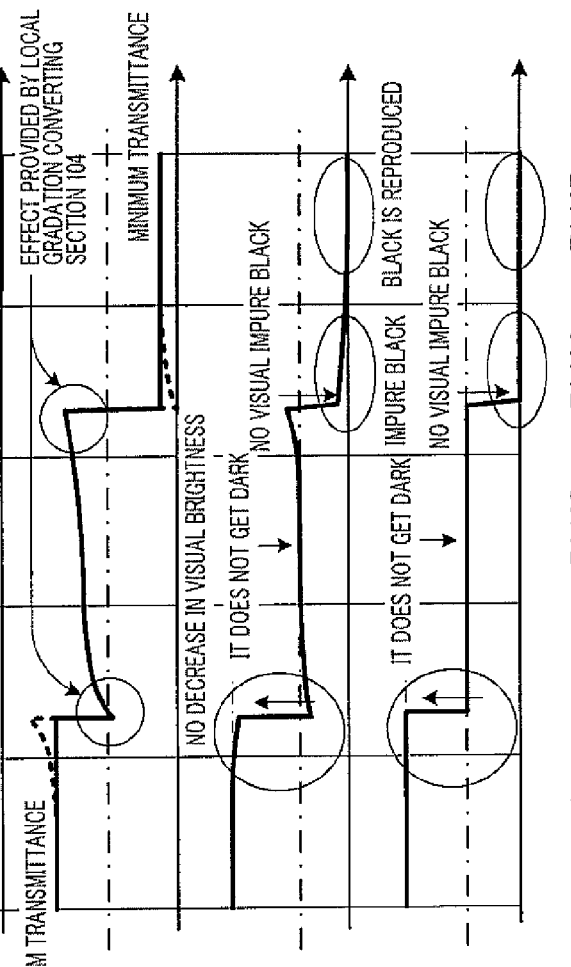

DISPLAY DEVICE AND DISPLAY METHOD

TECHNICAL FIELD

The present invention relates to a display apparatus which uses, for example, liquid crystal and a display method, and more particularly, relates to local dimming technique of a backlight light source of a transmissive liquid crystal display apparatus.

BACKGROUND ART

The liquid crystal display apparatus of a transmissive type radiates illumination light on a back face of a liquid crystal display element (hereinafter "liquid crystal panel") by means of an illuminating apparatus (hereinafter "backlight") and modulates the transmittance of illumination light by means of the liquid crystal display element and changes brightness to display an image. Although some projectors use reflective liquid crystal display elements, the only difference from the transmissive type is that transmittance changes to reflectivity.

A liquid crystal display apparatus generally emits light on the entire screen at a maximum brightness, irrespective of the display content of an input video signal. However, the proportion of backlight power consumption occupies in the power consumption of the entire liquid crystal display apparatus is significant, and a significant amount of power is consumed wastefully. Further, the liquid crystal panel cannot completely block light, and therefore black cannot be fully reproduced and a display image has lower contrast due to impure black.

Although there is a technique of dynamically changing the light emission brightness of a backlight to solve these problems, if there is a little bright part on a screen to display a video signal, the light emission brightness of backlight cannot be decreased, and therefore it is not possible to provide a great effect. Hence, there is a method (hereinafter "local dimming") of dividing the screen into a plurality of light emitting areas (about two to several hundreds) and changing light emission brightness in these light emitting areas according to display content matching each light emitting area in the input video signal (see, for example, Patent Literature 1).

According to local dimming, as long as there is no bright pixel in a specific light emitting area, even if there are bright pixels in other light emitting areas, the light emission brightness of backlight for this specific light emitting area can be decreased, so that it is possible to reduce power effectively. Further, the light emitting area belonging to a dark area in an image can keep the light emission brightness of backlight lower, so that it is possible to provide an effect of suppressing impure black of pixels in this light emitting area and enabling display of high contrast.

However, this local dimming generally has a problem that changing the light emission brightness of backlight per light emitting area causes change of brightness in a display image. A technique is proposed to solve this problem by predicting the magnitude of change of brightness and correcting image data (see, for example, Patent Literatures 1 and 2).

With the above technique, it is necessary to accurately learn the light emission brightness of backlight per pixel included in a video signal. Illumination light emitted by the backlight is diffused in a wide range, and therefore accurately predicting the light emission brightness of backlight per pixel not only requires a significant amount of computation but also actually has a great difficulty in terms of an algorithm and is not easy to carry out. However, theoretically, this technique is feasible, if cost and labor are spent.

Hereinafter, an operation of correcting the transmittance of each pixel of a video signal when the light emission brightness of backlight can be accurately predicted per pixel will be described. When the light emission brightness of backlight can be estimated per pixel, it is possible to calculate the corrected transmittance according to equation 1.

(Corrected transmittance)=(transmittance)*(maximum light amount)/(estimated light emission brightness value of backlight in pixel of interest)  (Equation 1)

By the way, the light emission brightness of backlight diffuses to lower brightness areas, and therefore the back face light amount in pixels at ends of high brightness areas decreases. Originally, with pixels of high brightness areas, the transmittance is expected to be set at a value close to the maximum value. In this case, the corrected transmittance is set to 1 or more according to the above equation. However, it is not physically possible to set the transmittance to 1 or more, and therefore the transmittance actually needs to be limited to a predetermined maximum transmittance. Therefore, the brightness decreases in pixels at ends of a high brightness area, thereby causing image deterioration such as unevenness in brightness, a decrease of contrast and halo (shade of a low brightness object produced in high brightness areas around a low brightness object).

Similarly, with pixels at ends of black areas, the light emission brightness of backlight in adjacent light emitting areas diffuses, and therefore the back face light amount of the pixels increases. However, the minimum transmittance has a limit, and it is not physically possible to further decrease and correct transmittance, and therefore the transmittance actually needs to be limited to the minimum transmittance. As a result, the brightness of pixels at ends of black areas increases, thereby causing image deterioration such as unevenness in brightness, impure black, a decrease of contrast and halo (blur of a high brightness object produced in black areas around a high brightness object).

The above problem caused by physical device characteristics is difficult to solve no matter how accurately the light emission brightness of backlight is predicted.

CITATION LIST

Patent Literature

PTL 1
Japanese Patent Application Laid-Open No. 2005-258403
PTL 2
Japanese Patent Application Laid-Open No. 2002-099250

SUMMARY OF INVENTION

Technical Problem

As described above, there are cases where, even if the light emission brightness of backlight can be accurately predicted per pixel, pixels belonging to ends of a bright area adjacent to a dark area has lower light emission brightness of backlight than the required brightness, thereby exceeding physical device characteristics. The brightness of these pixels decreases, thereby causing unevenness in brightness of a bright area or a decrease of contrast between a bright area and a dark area.

Further, with pixels at ends of black areas adjacent to a bright area, the light emission brightness of backlight in the adjacent light emitting areas diffuses, and therefore the back face light amount of these pixels increases. However, the minimum transmittance has a limit and the transmittance cannot be physically further decreased and corrected, and therefore the transmittance cannot be actually helped but being limited to the minimum transmittance and, as a result, there is a problem that the brightness of pixels at ends of black areas increases, thereby causing unevenness in brightness, impure black and a decrease of contrast.

Further, the phenomena that "the boundary of a bright background surrounding a dark foreground becomes dark" and "the boundary of a dark background surrounding a bright foreground becomes bright" are referred to as "halo" and cause significant image deterioration. Further, with a movie, the halo in the background follows movement of the foreground, and therefore is recognized as remarkable image deterioration.

It is therefore an object of the present invention to provide a display apparatus and a display method which can compensate for image deterioration caused by unevenness in brightness and partial decrease of contrast due to physical limitations of a display device, using human visual characteristics, in a local dimming technique of the display apparatus.

Solution to Problem

The display apparatus according to the present invention has: a light modulating section which modulates illumination light according to a light modulation coefficient and displays an image on a screen; a radiating section which radiates the illumination light on the light modulating section with an illumination light amount which varies per light emitting area of the screen; a control section which controls light emission brightness of the radiating section per light emitting area; a converting section which applies gradation conversion processing of a video signal and acquires a converted brightness value per pixel; and a driving section which controls the light modulation coefficient per pixel based on the acquired converted brightness value, and the converting section sets, in a processing target pixel in the video signal, conversion characteristics of decreasing a brightness value of the processing target pixel when a surrounding luminosity of the processing target pixel is higher, and performs gradation conversion using the set conversion characteristics.

Advantageous Effects of Invention

The present invention can compensate for image deterioration caused by unevenness in brightness and partial decrease of contrast due to physical limitations of a display device, using human visual characteristics, in a local dimming technique of the display apparatus.

BRIEF DESCRIPTION OF DRAWINGS

FIG. 11A is a view for describing a function and operation of conversion processing of a brightness value and illustrating a brightness value of an input video signal according to Embodiment 3 of the present invention;

FIG. 11B is a view for describing a function and operation of conversion processing of the brightness value and illustrating the brightness of backlight according to Embodiment 3 of the present invention;

FIG. 11C is a view for describing a function and operation of conversion processing of the brightness value and illustrating a surrounding luminosity according to Embodiment 3 of the present invention;

FIG. 11D is a view for describing a function and operation of conversion processing of the brightness value and illustrating a transmittance of a liquid crystal panel according to Embodiment 3 of the present invention;

FIG. 11E is a view for describing a function and operation of conversion processing of the brightness value and illustrating a controlled display brightness in the liquid crystal panel according to Embodiment 3 of the present invention;

FIG. 11F is a view for describing a function and operation of conversion processing of the brightness value and illustrating a visual brightness in the liquid crystal panel according to Embodiment 3 of the present invention;

FIG. 13A is a view for describing a function and operation of conversion processing of a brightness value and illustrating a brightness value of an input video signal according to Embodiment 4 of the present invention;

FIG. 13B is a view for describing a function and operation of conversion processing of the brightness value and illustrating the brightness of backlight according to Embodiment 4 of the present invention;

FIG. 13C is a view for describing a function and operation of conversion processing of the brightness value and illustrating a surrounding luminosity according to Embodiment 4 of the present invention;

FIG. 13D is a view for describing a function and operation of conversion processing of the brightness value and illustrating a transmittance of a liquid crystal panel according to Embodiment 4 of the present invention;

FIG. 13E is a view for describing a function and operation of conversion processing of the brightness value and illustrating a controlled display brightness in the liquid crystal panel according to Embodiment 4 of the present invention; and FIG. 13F is a view for describing a function and operation of conversion processing of the brightness value and illustrating a visual brightness in the liquid crystal panel according to Embodiment 4 of the present invention.

DESCRIPTION OF EMBODIMENTS

Figure 1:
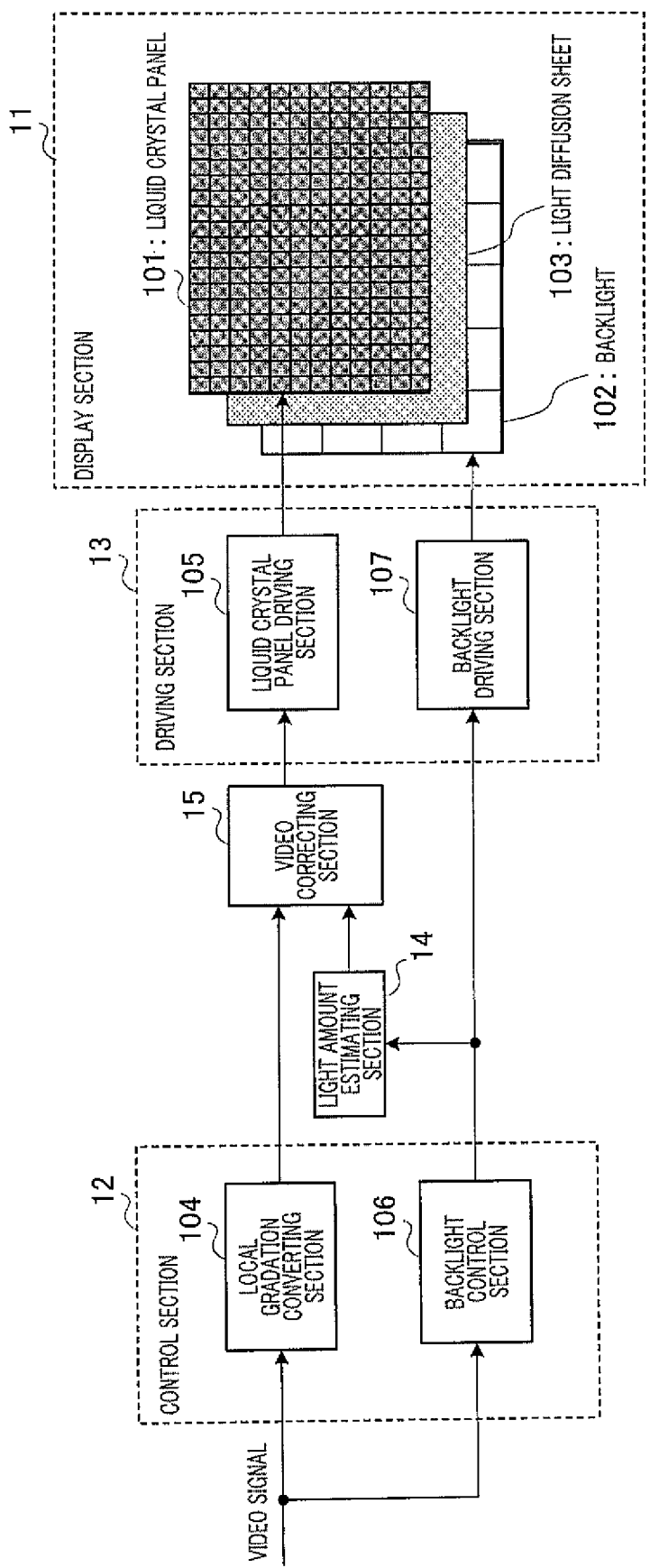
FIG. 1 is a block diagram illustrating a configuration of an image display apparatus according to Embodiment 1 of the present invention.

Hereinafter, an image display apparatus and an image display method according to embodiments of the present invention will be described with reference to the drawings.

The display apparatus according to the present embodiment is a display apparatus for an input video signal, and includes: a liquid crystal panel which can control the transmittance of light per pixel; a backlight which illuminates the back face of the liquid crystal panel with an illumination light amount which varies per light emitting area of the liquid crystal panel; a control section which controls the light emission brightness in the backlight per light emitting area; a gradation converting section which performs gradation conversion of a signal value of a pixel in the input video signal using gradation conversion characteristics; and a liquid crystal panel driving section which controls the transmittance based on the signal value after gradation conversion, and the gradation converting section sets gradation conversion characteristics including conversion characteristics of enhancing a contrast of a pixel of a processing target among pixels of the input video signal, for pixels in the surrounding of the pixel of the processing target, and conversion characteristics of converting the brightness of the pixel of the processing target according to average luminosity in the surrounding of the pixel of the processing target obtained using a signal value of a plurality of pixels disposed in the surrounding of the pixel of the conversion target.

Further, the gradation conversion characteristics may set, in the surrounding luminosity signal, conversion characteristics of converting a pixel of the processing target brighter when the surrounding of the pixel of the processing target is darker, and conversion characteristics of converting the pixel of the conversion processing target darker when the surrounding of the pixel of the conversion processing target is brighter.

Moreover, the display apparatus may further employ a configuration including a surrounding luminosity detecting section which generates a surrounding luminosity signal which is information indicating average luminosity in the surrounding of the pixel of the processing target, using a signal value of a plurality of pixels in the surrounding of the pixel of the processing target in the gradation converting section among signal values of pixels in the input video signal.

Further, the display apparatus may further employ a configuration including a surrounding luminosity detecting section which generates a surrounding luminosity signal indicating average luminosity in the surrounding of the pixel of the processing target obtained using a signal value of a plurality of pixels in the surrounding of the pixel of the processing target in the gradation converting section among signal values of pixels in the input video signal, and features of the gradation converting section may include using the surrounding luminosity signal as the average luminosity in the surrounding of the pixel of the processing target.

Furthermore, the display apparatus may further employ a configuration including a local histogram detecting section which generates a histogram obtained based on a signal of a plurality of pixels in the surrounding of the pixel of the processing target in the gradation converting section among signal values of pixels in the input video signal, and outputs the histogram to the gradation converting section, and features of the gradation converting section may include using the histogram as the average luminosity in the surrounding of the pixel of the processing target.

Still further, the local gradation conversion characteristics may further have conversion characteristics of increasing a luminosity of a halftone among signal values of the video signal.

Still further, the backlight control section may be configured to control the light emission brightness per light emitting area based on the signal value of the video signal after gradation correction.

Embodiment 1

Next, an image display apparatus according to Embodiment 1 will be described with reference to the drawings.

FIG. 1 is a block diagram illustrating a configuration of the image display apparatus according to Embodiment 1.

The image display apparatus according to Embodiment 1 has display section 11, control section 12, driving section 13, light amount estimating section 14 and video correcting section 15. Further, display section 11 has liquid crystal panel 101, backlight 102 and light diffusion sheet 103. Further, control section 12 has local gradation converting section 104 and backlight control section 106. Furthermore, driving section 13 has liquid crystal panel driving section 105 and backlight driving section 107.

<Liquid Crystal Panel 101>

Liquid crystal panel 101 modulates the illumination light radiated on its back face, according to a control signal input from liquid crystal panel driving section 105 to display an image on a screen which is the surface of liquid crystal panel 101.

Further, liquid crystal panel 101 is configured to sandwich a liquid crystal layer by means of a glass substrate, and controls the transmittance when a gate driver (not illustrated) and a source driver (not illustrated) apply signal voltages to the liquid crystal layer matching each pixel. The gate driver and the source driver of liquid crystal panel 101 receive control signals from liquid crystal panel driving section 105.

Further, liquid crystal panel 101 uses the IPS (In Plane Switching) scheme. The IPS scheme has features that liquid crystal molecules making simple motions of rotating in parallel to the glass substrate cause a color tone change depending on a direction to be seen at a wide view angle and a little color tone change at full gradation.

Note that liquid crystal panel 101 may utilize any device which performs optical modulation, and may use a VA (Vertical Alignment) scheme as another optical modulation scheme.

That is, liquid crystal panel 101 is a type of a non-self luminous display device, and another type of a non-self luminous display device may be substituted as the display section of the present invention. Hence, the image display apparatus according to the present invention is by no means limited to a liquid crystal display apparatus. Further, the transmittance is an optical modulation coefficient which is used when the display device is the liquid crystal panel and which is determined according to a video signal per pixel, and therefore another optical modulation coefficient is used when a display device used is not a liquid crystal panel.

<Backlight 102>

Backlight 102 radiates illumination light for displaying an image, on the back face of liquid crystal panel 101.

Backlight 102 has a light source. Based on the control signal output from backlight driving section 107, backlight 102 controls, as the fundamental unit, a light emitting area, which uses at least one or more light sources as one unit. That is, the light emitting areas are independently controlled based on a control signal from backlight driving section 107, so that it is possible to radiate light having different light emission brightness per light emitting area. The respective light emitting areas are provided to oppose image display areas of liquid crystal panel 101, and mainly illuminate opposing image display areas, respectively. Meanwhile, "mainly illuminate" means that part of illumination light is also radiated on image display areas which are not opposed.

Meanwhile, an LED is used for a light source to emit white light. Note that the light source is not limited to a component which directly emits white light. For example, the light source may emit white light by blending R, G and B lights. Further, a combination of a blue light emitting diode and yellow fluorescent material may be used. Further, another type of a light source (for example, a semiconductor laser light source or organic electroluminescence (EL) light source) may be used instead of an LED.

<Light Diffusion Sheet 103>

Light diffusion sheet 103 is arranged between liquid crystal panel 101 and backlight 102, and diffuses illumination light such that illumination light radiated from backlight 102 becomes uniform with respect to liquid crystal panel 101.

<Local Gradation Converting Section 104>

Local gradation converting section 104 sets different gradation conversion characteristics per partial area of an input video signal, and performs conversion processing of a brightness value per partial area according to the set gradation conversion characteristics.

Note that a partial area includes at least one or more pixels, and refers to an area which is part of the entire area of an input video signal. That is, the partial area may be one pixel of an input video signal, or may be a collection of a plurality of pixels. Further, a light emitting area, which is the unit of control of local dimming in backlight 102 may be a partial area, or a plurality of light emitting areas may be a partial area.

Figure 2:
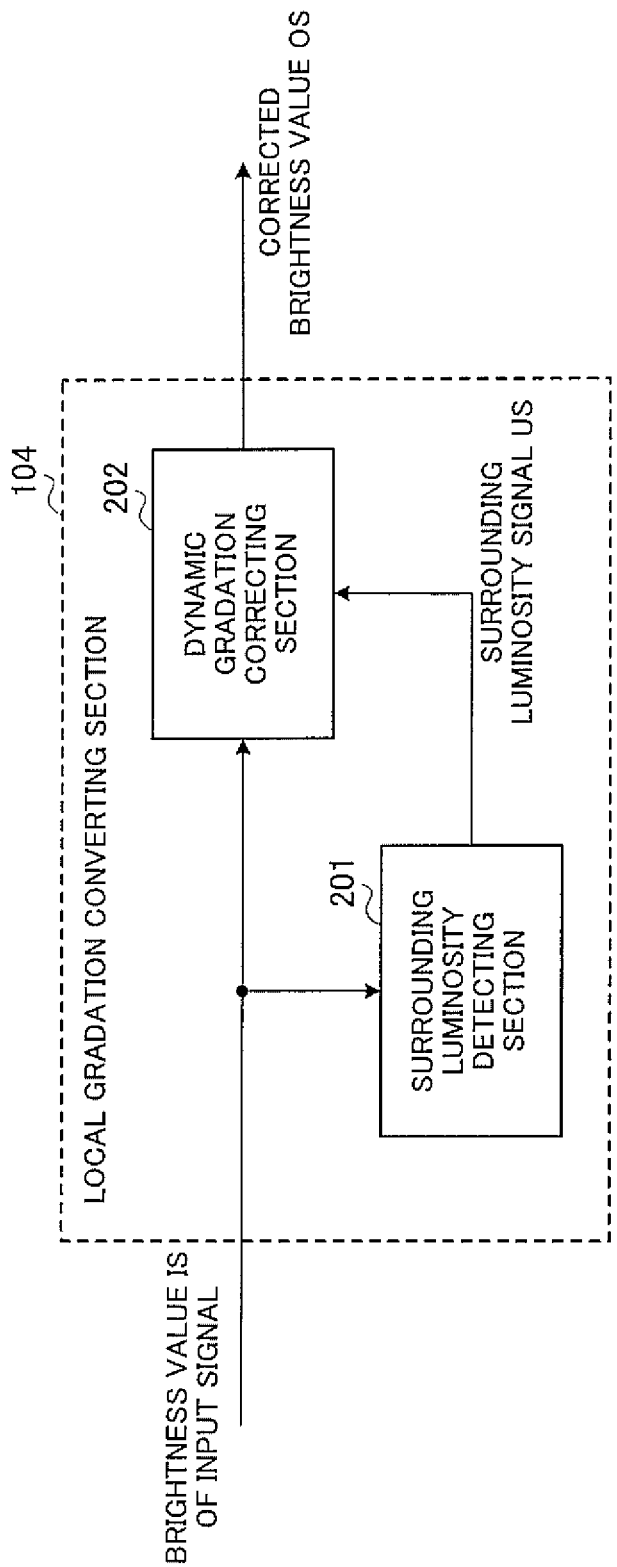
FIG. 2 is a block diagram illustrating a specific configuration of a local gradation converting section according to Embodiment 1 of the present invention.

FIG. 2 is a diagram illustrating a specific configuration of local gradation converting section 104 according to Embodiment 1. Local gradation converting section 104 has surrounding luminosity detecting section 201 and dynamic gradation correcting section 202. Hereinafter, for ease of description, surrounding luminosity detecting section 201 and dynamic gradation correcting section 202 perform processing per pixel. Further, a pixel of a conversion processing target in surrounding luminosity detecting section 201 and dynamic gradation correcting section 202 is referred to as "conversion pixel."

<Surrounding Luminosity Detecting Section 201>

Surrounding luminosity detecting section 201 calculates surrounding luminosity US per conversion pixel, based on a brightness value of adjacent pixels in the surrounding of the conversion pixel, and generates a surrounding luminosity signal indicating the calculated surrounding luminosity US. Further, surrounding luminosity detecting section 201 outputs the generated surrounding luminosity signal to dynamic gradation correcting section 202. Meanwhile, surrounding luminosity US refers to average luminosity in the surrounding of the conversion pixel. When this surrounding luminosity US is lower than a brightness value of the conversion pixel, the conversion pixel is brighter than the surrounding. By contrast with this, when surrounding luminosity US is higher than a brightness value of the conversion pixel, the conversion pixel is darker than the surrounding.

More specifically, surrounding luminosity detecting section 201 performs filter processing of brightness values of pixels disposed in the surrounding of the conversion pixel using a two dimensional lowpass filter or a one dimensional lowpass filter. It is preferable that filter characteristics of this lowpass filter nearly match the degree of optical expansion of light in backlight 102. Further, the filter may be configured as an IIR (Infinite Impulse Response) filter to reduce a computation amount.

Note that when light emitting areas of backlight 102 are used as a partial area, the average value of the brightness values of pixels included in one light emitting area is used as a representative value of the light emitting area. For example, when a video signal of 1920×1080 pixels is divided into 6×6 light emitting areas and controlled, one light emitting area includes 320×180 pixels. Hence, the average value of the brightness values of 320×180 pixels is used as a brightness value of one light emitting area.

Further, surrounding luminosity detecting section 201 may generate a surrounding luminosity signal per conversion pixel to output the surrounding luminosity signal to dynamic gradation correcting section 202. Moreover, surrounding luminosity detecting section 201 may generate surrounding luminosity signals for all conversion pixels included in a video signal, and then output the surrounding luminosity signals to dynamic gradation correcting section 202.

<Dynamic Gradation Correcting Section 202>

Dynamic gradation correcting section 202 dynamically sets gradation conversion characteristics per conversion pixel, based on surrounding luminosity US calculated in surrounding luminosity detecting section 201, and converts brightness value IS of the conversion pixel to generate brightness value OS. Further, dynamic gradation correcting section 202 outputs converted brightness value OS to video correcting section 15.

Above "dynamic" means that the gradation conversion characteristics change per conversion pixel. This is because surrounding luminosity US changes per conversion pixel.

Note that dynamic gradation correcting section 202 sets visual characteristics which the human visual sense unconsciously makes, particularly, conversion characteristics mimicking visual characteristics which are referred to as "tone contrast" and "color contrast," and performs conversion according to these conversion characteristics. For the visual characteristics, visual characteristics referred to "tone contrast" are utilized that, even when the brightness in a certain point does not change physically, if the surrounding is bright, a point is perceived darker and, if the surrounding is dark, the point is perceived brighter. In this case, the visual sense feels a contrast according to a contrast of a comparatively large vicinity (local area) in the surrounding of the pixel of interest. That is, the visual sense recognizes local contrast as a contrast. Meanwhile, the local contrast refers to local contrast in part of the entire area of an input video signal.

Further, the visual brightness of a video signal is determined according to a gradation level of a low frequency component of the entire video signal irrespectively of the change of a local brightness. Note that the visual brightness is an apparent brightness the user perceives when the user sees the liquid crystal panel, and is different from a brightness value which is actually defined in a signal.

Meanwhile, a method of setting gradation conversion characteristics based on surrounding luminosity US in dynamic gradation correcting section 202 will be described with reference to the drawings.

Figure 3:
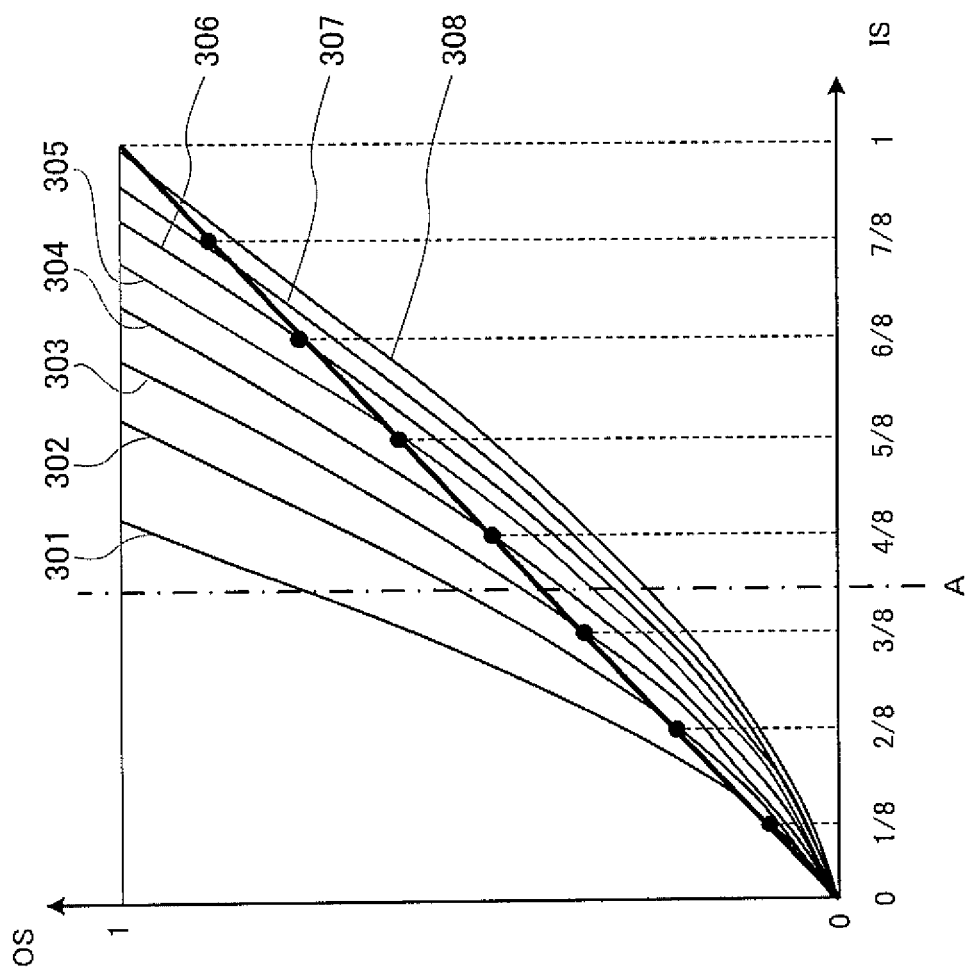
FIG. 3 is a view for describing a method of setting gradation conversion characteristics in a dynamic gradation correcting section according to Embodiment 1 of the present invention.

FIG. 3 is a view for describing a method of setting gradation conversion characteristics in dynamic gradation correcting section 202 according to Embodiment 1.

The horizontal axis of the graph illustrated in FIG. 3 is brightness value IS of a conversion pixel, and the vertical axis is converted brightness value OS output from dynamic gradation correcting section 202. Note that the maximum value of the brightness value is 1 on both of the horizontal axis and the vertical axis.

Further, a plurality of curves 301 to 308 in FIG. 3 are a group of a plurality of curves indicating gradation conversion characteristics set per surrounding luminosity US output from surrounding luminosity detecting section 201. Note that although FIG. 3 illustrates only eight gradation conversion characteristics for ease of description, it is preferable to set a greater number of gradation conversion characteristics to enable more precise gradation correction.

Dynamic gradation correcting section 202 selects an adequate curve according to surrounding luminosity US, making it possible to express human visual characteristics.

When surrounding luminosity US becomes lower (darker), the curve selected by dynamic gradation correcting section 202 transitions from curve 308 to curve 301. That is, if brightness value IS of the conversion pixel is fixed, converted brightness value OS becomes higher (brighter) when the surrounding of the conversion pixel becomes darker.

By contrast with this, when surrounding luminosity US becomes higher (brighter), the curve selected by dynamic gradation correcting section 202 transitions from curve 301 to curve 308. That is, if brightness value IS of the conversion pixel is fixed, converted brightness value OS becomes lower (darker) when the surrounding of the conversion pixel becomes brighter.

These conversion characteristics directly express "tone contrast" which is human visual characteristics, and, if input brightness value IS is fixed to a predetermined level, corrected brightness value OS can be expressed with monotonic decrease characteristics with respect to surrounding luminosity US.

Meanwhile, the line connecting between the "●" symbols in FIG. 3 will be described.

The brightness which people perceive is known to be recognized as average luminosity in a comparatively wide range instead of brightness conversion of details of a video signal. Consequently, the visual brightness of a video signal can be expressed with characteristics of OS with respect to IS in case of IS=US in FIG. 3 (IS=US means average luminosity in a wide range).

The line connecting between these "●" symbols is a straight line of an inclination 1 passing the origin in FIG. 3, and expresses characteristics that a visual brightness is not changed. Curves 301 to 308 pass one point on the straight line determined in this way, and is set to increase corrected brightness value OS when surrounding luminosity US decreases.

In FIG. 3, the change to corrected brightness value OS from input brightness value IS when surrounding luminosity US is fixed forms a downward convex curve. This is characteristics of expanding the ratio of the change of corrected brightness value OS with respect to the ratio of the change of brightness value IS, and enhances a visual contrast. Consequently, these characteristics enhance local contrast which makes people sense contrast without changing brightness.

Note that the curve group illustrated in FIG. 3 may be set in advance, or may be set according to an input video signal. When the curve group is set in advance, this curve group is held in an internal memory (not illustrated) of dynamic gradation correcting section 202.

<Backlight Control Section 106>

Backlight control section 106 generates a control signal which defines the light emission brightness of backlight 102 per light emitting area of backlight 102 based on the input video signal, and outputs this control signal to backlight driving section 107 and light amount estimating section 14.

More specifically, backlight control section 106 calculates a brightness value of the light emitting area, based on the brightness values of pixels included in the light emitting area. For example, the maximum brightness value among the brightness values of pixels included in the above light emitting area may be the brightness value of the light emitting area. Further, the average value of the brightness values of pixels included in the light emitting area and the maximum value of the brightness value of the pixel included in this light emitting area may be weighted to use a combined value of these weighting results as the brightness value of the light emitting area. Meanwhile, a weight used for weighting is set to increase for the average value when the difference between the average value and the maximum value is greater, and increase for the maximum value when the difference between the average value and the maximum value is lower. According to the characteristics, it is possible to set the adequate light emission brightness of backlight with little flickers without over-reacting to the maximum value included in the light emitting area.

Further, backlight control section 106 performs filter processing of the brightness value of the light emitting area calculated as described above to make the boundary between adjacent light emitting areas less distinct. More specifically, filter processing is applied to the light emitting area using the two dimensional lowpass filter.

Further, based on the brightness value after filter processing, a control signal for controlling backlight 102 to actually emit light is generated.

Note that the light emission brightness of backlight 102 may be determined using one of various conventionally proposed methods. Based on the brightness value of the pixel in the above light emitting area, the maximum value or average value of R, G and B, or a value blending the maximum value and the average value, the light emission brightness of backlight 102 may also be determined per light emitting area. Further, the light emission brightness of the light emitting area may be determined referring to the pixels of the light emitting areas in the surrounding in addition to the pixels in the light emitting area. Further, the light emission brightness may be determined taking into account information about a previous frame or previous field and motion vector. In this case, it is possible to realize local dimming with little flickering of edges and little flickers.

<Backlight Driving Section 107>

Backlight driving section 107 generates a control signal for controlling backlight 102 per light emitting area, based on the control signal output from backlight control section 106, and outputs this control signal to backlight 102.

<Light Amount Estimating Section 14>

Light amount estimating section 14 estimates per pixel an estimation value of a brightness (hereinafter "back face brightness" for ease of description) of illumination light which arrives at the back face of liquid crystal panel 101, based on the control signal input from backlight control section 106. Light amount estimating section 14 outputs the estimation value of the back face brightness per pixel, to video correcting section 15.

<Video Correcting Section 15>

Video correcting section 15 corrects corrected brightness value OS input from local gradation converting section 104 per pixel, based on the estimation value of the back face brightness input from light amount estimating section 14. Hereinafter, for ease of description, the brightness resulting from this correction is referred to as "recorrected brightness value OS'." Recorrected brightness value OS' of a certain pixel can be acquired by dividing corrected brightness value OS of this pixel by the estimation value of the back face brightness of this pixel. Video correcting section 15 outputs recorrected brightness value OS' to liquid crystal panel driving section 105.

When the brightness value is recorrected as described above, recorrected brightness value OS' is acquired by dividing corrected brightness value OS by the estimation value of the back face brightness. Hence, in case of a halftone, it is possible to increase the brightness value according to the estimation value of the back face brightness and increase the transmittance of liquid crystal panel 101, and consequently, compensate for a decrease in a display brightness caused by local dimming control in backlight control section 106.

<Liquid Crystal Panel Driving Section 105>

Liquid crystal panel driving section 105 generates a control signal for controlling the transmittance of each pixel in liquid crystal panel 101, based on corrected brightness value OS input from local gradation converting section 104, and outputs this control signal to liquid crystal panel 101.

Next, an operation in control section 12 of the image display apparatus will be described with reference to the drawings.

Figure 4:
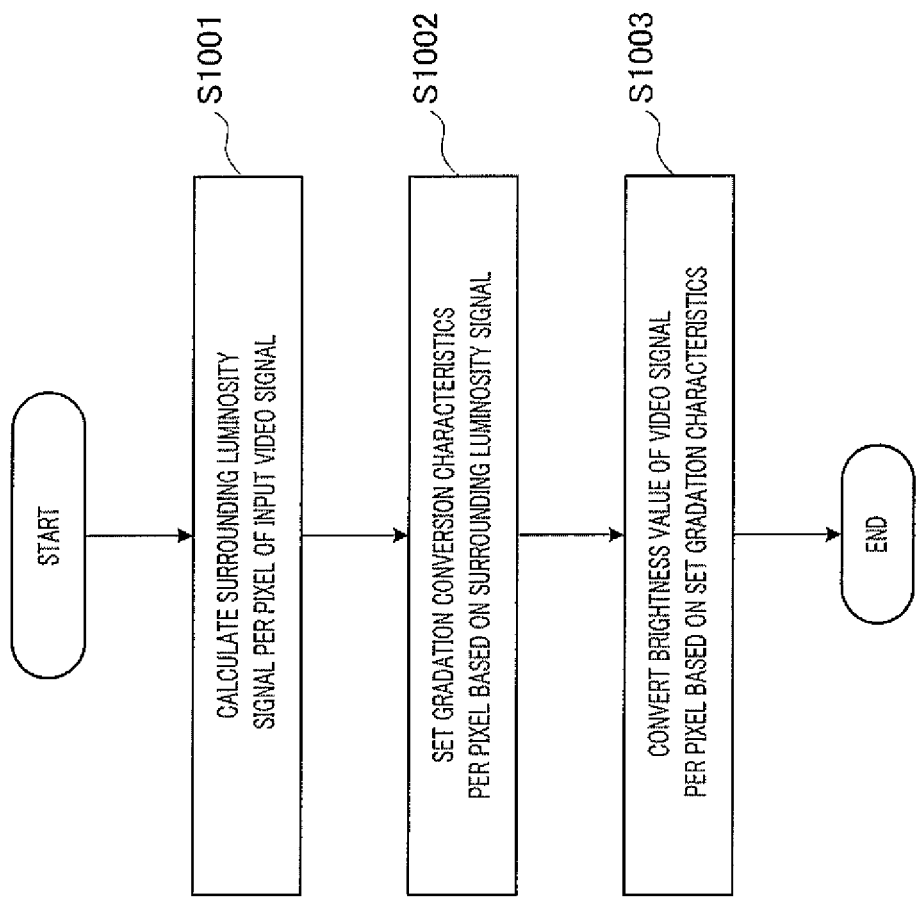
FIG. 4 is a flowchart illustrating an operation of setting a transmittance of a liquid crystal panel according to Embodiment 1 of the present invention.

FIG. 4 is a flowchart illustrating an operation of setting the transmittance of liquid crystal panel 101 according to Embodiment 1.

First, surrounding luminosity detecting section 201 calculates the surrounding luminosity per pixel of the input video signal, and generates a surrounding luminosity signal indicating the calculated surrounding luminosity (S1001).

Next, dynamic gradation correcting section 202 selects one gradation conversion characteristic from a plurality of gradation conversion characteristics stored inside in advance, based on the surrounding luminosity (S1002).

Further, dynamic gradation correcting section 202 converts the brightness value of the conversion pixel using the gradation conversion characteristic selected in S1002 (S1003).

By converting the brightness values of all pixels included in the video signal, it is possible to convert the input video signal into the video signal taking characteristics of a tone contrast into account.

Figure 5:
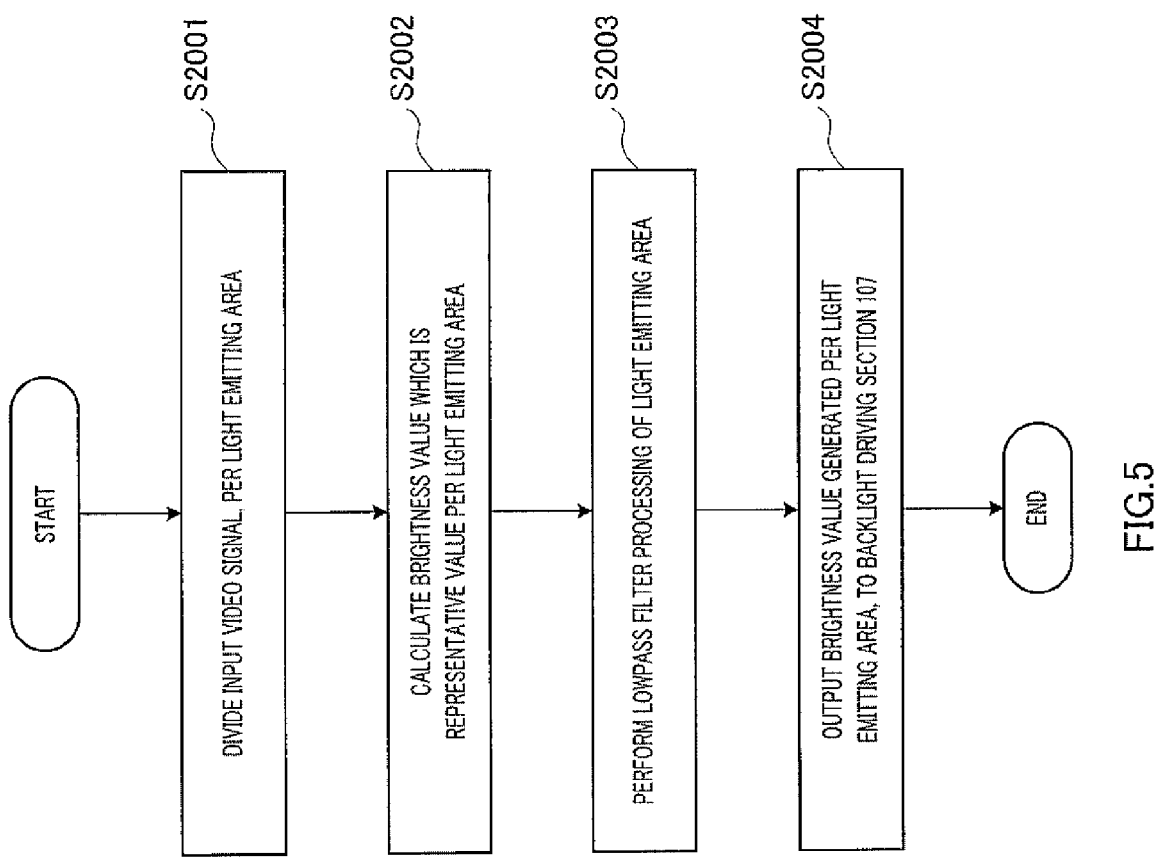
FIG. 5 is a flowchart illustrating an operation of setting the light emission brightness of backlight according to Embodiment 1 of the present invention.

FIG. 5 is a flowchart illustrating an operation of setting the light emission brightness of backlight 102 according to Embodiment 1.

First, backlight control section 106 divides the input video signal, per light emitting area of, for example, 320×180 pixels (S2001).

Next, backlight control section 106 calculates the brightness value of the light emitting area based on the brightness values of the pixels in the light emitting area. For example, the maximum brightness value among the brightness values of pixels included in the light emitting area is used as the brightness value of the light emitting area (S2002).

Further, backlight control section 106 performs filter processing using a lowpass filter based on the brightness value per light emitting area, and calculates the brightness value taking into account the brightness value of the light emitting area and brightness values of the light emitting areas disposed in the surrounding of the light emitting area (S2003).

Finally, backlight control section 106 outputs the brightness value of each light emitting area calculated in S2003, to backlight driving section 107 (S2004).

FIGS. 6A to 6F are views for describing a function and operation of conversion processing of a brightness value according to Embodiment 1. Note that the horizontal axes of FIGS. 6A to 6F are pixels of the video signal which are continuous in the horizontal direction, and divided into five periods BLK 1 to BLK 5 for ease of description. That is, periods BLK 1 to BLK 5 each include a plurality of pixels. FIG. 7 is a view illustrating the relationship between pixels in a video signal and periods BLK 1 to BLK 5. With the example illustrated in FIG. 7, periods BLK 1 to BLK 5 are continuously disposed in the horizontal direction, and each include five pixels. Further, the brightness of backlight 102 is controlled on a per period (BLK) basis.

Figure 6:
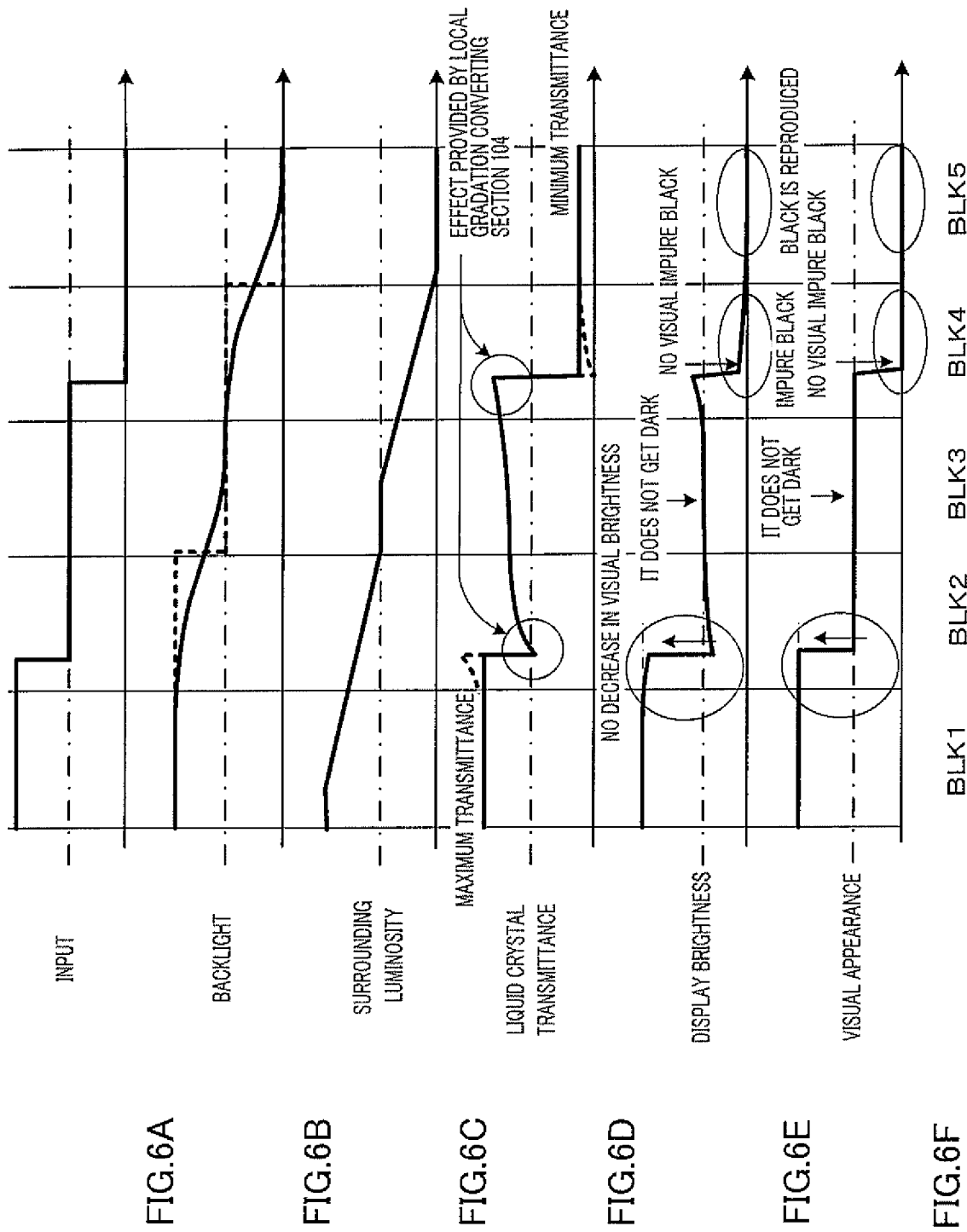
FIG. 6A is a view for describing a function and operation of conversion processing of a brightness value and illustrating a brightness value of an input video signal according to Embodiment 1 of the present invention.
FIG. 6B is a view for describing a function and operation of conversion processing of the brightness value and illustrating the brightness of backlight according to Embodiment 1 of the present invention.
FIG. 6C is a view for describing a function and operation of conversion processing of the brightness value and illustrating a surrounding luminosity according to Embodiment 1 of the present invention.
FIG. 6D is a view for describing a function and operation of conversion processing of a brightness value and illustrating a transmittance of a liquid crystal panel according to Embodiment 1 of the present invention.
FIG. 6E is a view for describing a function and operation of conversion processing of the brightness value and illustrating a controlled display brightness in the liquid crystal panel according to Embodiment 1 of the present invention.
FIG. 6F is a view for describing a function and operation of conversion processing of the brightness value and illustrating a visual brightness in the liquid crystal panel according to Embodiment 1 of the present invention.
Figure 7:
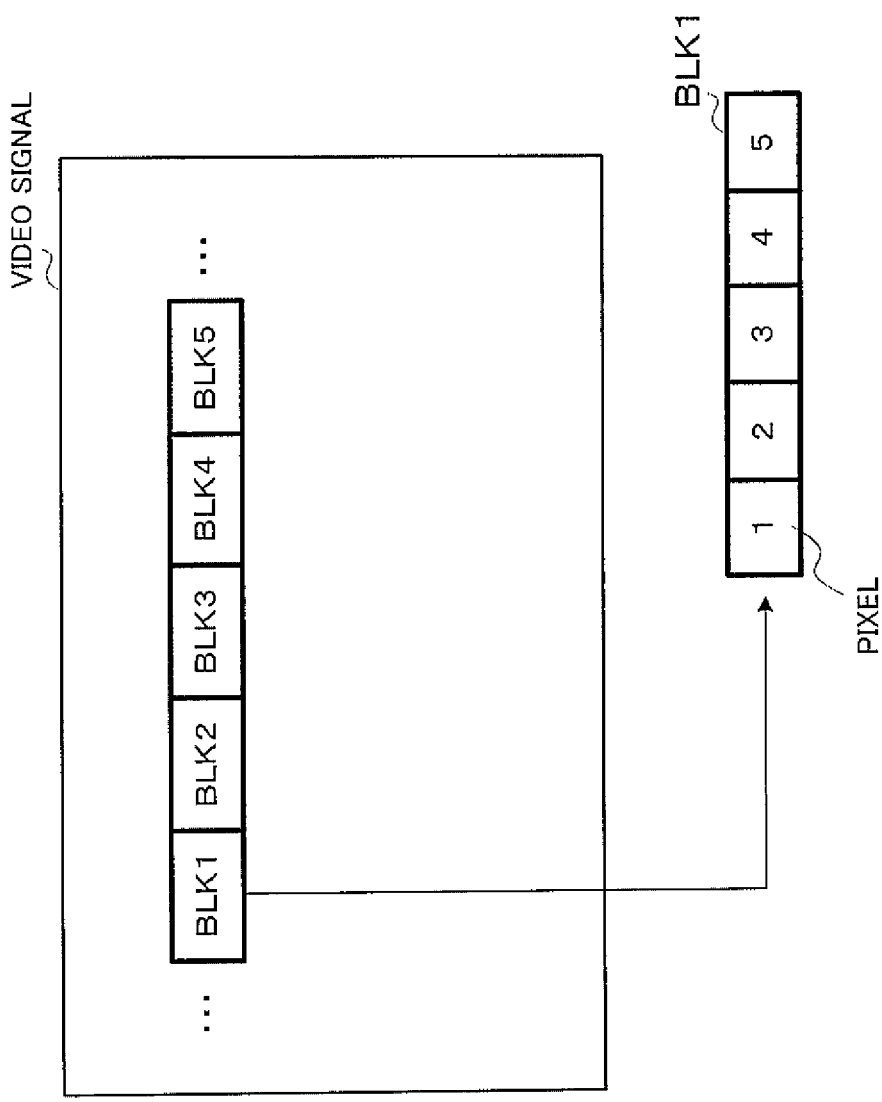
FIG. 7 is a view illustrating the relationship between pixels in a video signal and periods BLK 1 to BLK 5.

FIG. 6A is a view illustrating brightness values of pixels of periods BLK 1 to BLK 5 of the input video signal. FIG. 6B is a view illustrating the brightness of backlight 102. FIG. 6C is a view illustrating the surrounding luminosities of pixels in periods BLK 1 to BLK 5 of the input video signal. FIG. 6D is a view illustrating the transmittance of liquid crystal panel 101 defined by the control signal output from liquid crystal panel driving section 105. FIG. 6E is a view illustrating the display brightness controlled in liquid crystal panel 101. FIG. 6F is a view illustrating the visual brightness in liquid crystal panel 101.

In FIG. 6B, the dotted line indicates the light emission brightness of backlight 102 of each light emitting area defined by the control signal output from backlight driving section 107. The solid line indicates the back face brightness of liquid crystal panel 101. That is, although backlight 102 emits illumination light at the brightness determined per period according to a control signal (dotted line in FIG. 6B), the illumination light is diffused by, for example, the function of light diffusion sheet 103. Therefore, when there is a difference in the light emission brightness of backlight 102 between adjacent periods as in, for example, periods BLK 2 and BLK 3, the brightness (back face brightness) of illumination light which actually arrives at the back face of liquid crystal panel 101 varies per pixel (solid line in FIG. 6B). In Embodiment 1, the back face brightness of each pixel is estimated by light amount estimating section 14.

Further, as illustrated in FIG. 6A, when the brightness value of the input video signal is not constant, the surrounding luminosity varies per pixel in the part at which the brightness value changes (for example, period BLK 2) and its surrounding (for example, period BLK 1) (FIG. 6C).

Thus, when there is a difference between the brightness value of a certain pixel and its surrounding luminosity (that is, local contrast), local gradation converting section 104 performs gradation correction (conversion processing of a brightness value) of a pixel (that is, locally) for enhancing the difference using the above gradation conversion characteristics.

It is found upon comparison of FIGS. 6A and 6C that, in the center part of period BLK 2, for example, the brightness value of the pixel is lower than the surrounding luminosity of the pixel. Hence, gradation correction of each pixel in this part is performed to further decrease the brightness, and the transmittance of liquid crystal panel 101 determined based on the corrected brightness value is lower when the surrounding is brighter as surrounded by the circle on the left side in FIG. 6D.

Near, for example, the boundary between periods BLK 1 and BLK 2, the brightness value of the pixel is higher than the surrounding luminosity of the pixel. Hence, gradation correction of each pixel in this part is performed to further increase the brightness value. However, the brightness value of each pixel in this part is already a maximum value within a settable range, and gradation correction for further increasing the brightness value cannot be physically realized even if such gradation correction is possible in terms of calculation. That is, the transmittance of each pixel in this part does not become higher deviating from the range which can be realized in liquid crystal panel 101 (phenomenon indicated by the dotted line in FIG. 6D), and is maintained at a maximum value.

On, for example, the left side part of period BLK 4, the brightness value of the pixel is higher than the surrounding luminosity of the pixel. Hence, gradation correction of each pixel in this part is performed to further increase the brightness, and the transmittance of liquid crystal panel 101 determined based on the corrected brightness value becomes higher when the surrounding is darker as surrounded by the circle on the right side in FIG. 6D.

In, for example, the center part of period BLK 4, the brightness value of the pixel is lower than the surrounding luminosity of the pixel. Hence, gradation correction of each pixel in this part is performed to further decrease the brightness value. However, the brightness value of each pixel in this part is already a minimum value in the settable range, and gradation correction for further decreasing the brightness value cannot be physically realized even if such gradation correction is possible in terms of calculation. That is, the transmittance of each pixel in this part does not become lower deviating from the range which can be realized in liquid crystal panel 101 (phenomenon indicated by the dotted line in FIG. 6D), and is maintained at a minimum value.

Further, in Embodiment 1, the back face brightness (FIG. 6B) is estimated, and the corrected brightness value is recorrected based on this estimation value. When the brightness value is recorrected, in case of a halftone, processing of increasing the brightness value according to the estimation value of the back face brightness is performed. Hence, the transmittance of liquid crystal panel 101 matching the recorrected brightness value (FIG. 6D) increases entirely in an area in which the brightness value of the input video signal is a halftone.

The display brightness (FIG. 6E) in liquid crystal panel 101 is a product of the back face brightness (that is, the brightness of illumination light which actually arrives at the back face of liquid crystal panel 101) indicated by the solid line in FIG. 6B and the transmittance indicated by the solid line in FIG. 6D.

Therefore, as illustrated in FIG. 6E, although the brightness at the end of a bright area facing a dark area decreases due to a decrease in the back face brightness in period BLK 2, for example, the brightness at the end of a dark area facing a bright area also decreases in proportion to the decrease according to an effect of gradation correction. In this case, when a decrease in the brightness of the bright area is compensated for according to the effect of the tone contrast produced in the user's visual sense, it is possible to make the user perceive that the brightness of this area is maintained at an original level (maximum value) (an upward arrow in period BLK 2).

Further, although the brightness at the end of a dark area facing a bright area increases due to an increase in the back face brightness in period BLK 4, for example (that is, a phenomenon of impure black occurs), the brightness at the end of the bright area facing the dark area also increases in proportion to the increase according to an effect of gradation correction. In this case, when an increase in the brightness of the dark area is compensated for according to the effect of the tone contrast produced in the user's visual sense, it is possible to make the user perceive that the brightness of this area is maintained at an original level (minimum value) (a downward arrow in period BLK 4).

That is, in an area in which the transmittance cannot be expressed by the physical characteristics, the light emission brightness (FIG. 6E) of liquid crystal panel 101 is set utilizing characteristics of the tone contrast. By this means, it is possible to express (FIG. 6F) the brightness such that the impure black phenomenon is not perceived while maintaining the brightness of the bright part.

Further, by increasing the brightness value of the halftone by resurrecting the brightness value based on the estimation value of the back face brightness, it is possible to compensate for a decrease in the brightness due to local dimming control and, consequently, realize the display brightness of liquid crystal panel 101 equal to the brightness value of the input video signal.

As described above, in Embodiment 1, local gradation converting section 104 can convert the brightness value of the input video signal, according to the gradation conversion characteristics using human visual characteristics. Further, liquid crystal panel driving section 105 generates a control signal for controlling the transmittance of liquid crystal panel 101, based on a conversion result of local gradation converting section 104, and outputs the control signal to liquid crystal panel 101 to control the transmittance. Further, backlight control section 106 can set the brightness value which defines the light emission brightness per light emitting area of backlight 102. Further, backlight driving section 107 generates a control signal for controlling backlight 102 to emit light, based on the brightness value defined per light emitting area, and outputs the control signal to backlight 102 to control the LED of backlight 102 at different light emission brightness per light emitting area.

Particularly, in Embodiment 1, since the brightness value is converted according to the gradation conversion characteristic using the human visual characteristics as described above, it is possible to compensate for image deterioration caused by unevenness in brightness or a partial decrease of contrast due to physical limitations of liquid crystal panel 101, using human visual characteristics.

Embodiment 2

Next, an image display apparatus according to Embodiment 2 will be described with reference to the drawings.

Figure 8:
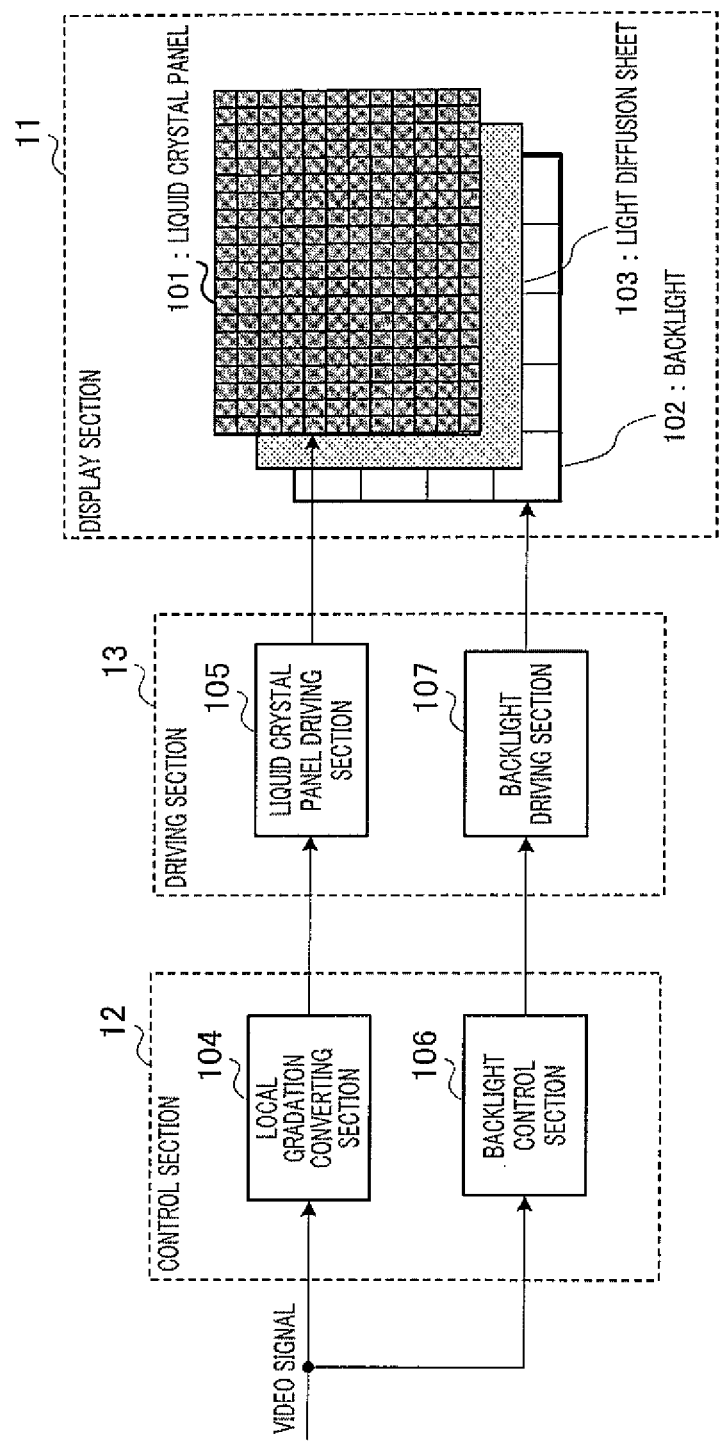
FIG. 8 is a block diagram illustrating a configuration of an image display apparatus according to Embodiment 2 of the present invention.

FIG. 8 is a block diagram illustrating a configuration of the image display apparatus according to Embodiment 2.

The image display apparatus according to Embodiment 2 has display section 11, control section 12 and driving section 13. Further, display section 11 has liquid crystal panel 101, backlight 102 and light diffusion sheet 103. Further, control section 12 has local gradation converting section 104 and backlight control section 106. Furthermore, driving section 13 has liquid crystal panel driving section 105 and backlight driving section 107.

That is, the image display apparatus according to Embodiment 2 differs from the image display apparatus according to above Embodiment 1 in that light amount estimating section 14 and video correcting section 15 are not provided.

<Liquid Crystal Panel 101>

Liquid crystal panel 101 modulates illumination light radiated on its back face, according to a control signal input from liquid crystal panel driving section 105 to display an image on a screen which is the surface of liquid crystal panel 101.

Further, liquid crystal panel 101 is configured to sandwich a liquid crystal layer by means of a glass substrate, and controls the transmittance when a gate driver (not illustrated) and a source driver (not illustrated) apply signal voltages to the liquid crystal layer matching each pixel. The gate driver and the source driver of liquid crystal panel 101 receive control signals from liquid crystal panel driving section 105.

Further, liquid crystal panel 101 uses the IPS scheme. The IPS scheme has features that liquid crystal molecules making simple motions of rotating in parallel to the glass substrate cause a color tone change depending on a direction to be seen at a wide view angle and a little color tone change at full gradation.

Note that liquid crystal panel 101 may utilize any device which performs optical modulation, and may use a VA scheme as another optical modulation scheme.

That is, liquid crystal panel 101 is a type of a non-self luminous display device, and another type of a non-self luminous display device may be substituted as the display section of the present invention. Hence, the image display apparatus according to the present invention is by no means limited to a liquid crystal display apparatus. Further, the transmittance is an optical modulation coefficient which is used when the display device is the liquid crystal panel and which is determined according to a video signal per pixel, and therefore another optical modulation coefficient is used when a display device used is not a liquid crystal panel.

<Backlight 102>

Backlight 102 radiates illumination light for displaying an image, on the back face of liquid crystal panel 101.

Backlight 102 has a light source. Based on the control signal output from backlight driving section 107, backlight 102 controls, as the fundamental unit, a light emitting area, which uses at least one or more light sources as one unit. That is, the light emitting areas are independently controlled based on a control signal from backlight driving section 107, so that it is possible to radiate light having different light emission brightness per light emitting area. The respective light emitting areas are provided to oppose image display areas of liquid crystal panel 101, and mainly illuminate opposing image display areas. Meanwhile, "mainly illuminate" means that part of illumination light is also radiated on image display areas which are not opposed.

Meanwhile, an LED is used for a light source to emit white light. Note that the light source is not limited to a component which directly emits white light. For example, the light source may emit white light by blending R, G and B lights. Further, another type of a light source (for example, a semiconductor laser light source or organic EL light source) may be used instead of an LED.

<Light Diffusion Sheet 103>

Light diffusion sheet 103 is arranged between liquid crystal panel 101 and backlight 102, and diffuses illumination light such that illumination light radiated from backlight 102 becomes uniform with respect to liquid crystal panel 101.

<Local Gradation Converting Section 104>

Local gradation converting section 104 sets different gradation conversion characteristics per partial area of an input video signal, and performs conversion processing of a brightness value per partial area according to the set gradation conversion characteristics.

Note that a partial area includes at least one or more pixels, and refers to an area which is part of the entire area of an input video signal. That is, the partial area may be one pixel of an input video signal, or may be a collection of a plurality of pixels. Further, a light emitting area, which is the unit of control of local dimming in backlight 102 may be a partial area, or a plurality of light emitting areas may be a partial area.

A specific configuration of local gradation converting section 104 has been described in Embodiment 1 using FIG. 2.

<Liquid Crystal Panel Driving Section 105>

Liquid crystal panel driving section 105 generates a control signal for controlling the transmittance of each pixel in liquid crystal panel 101, based on corrected brightness value OS input from local gradation converting section 104, and outputs this control signal to liquid crystal panel 101.

<Backlight Control Section 106>

Backlight control section 106 generates a control signal which defines the light emission brightness of backlight 102 per light emitting area of backlight 102 based on the input video signal, and outputs this control signal to backlight driving section 107.

More specifically, backlight control section 106 calculates a brightness value of the light emitting area, based on the brightness values of pixels included in the light emitting area. For example, the maximum brightness value among the brightness values of pixels included in the above light emitting area may be the brightness value of the light emitting area. Further, the average value of the brightness values of pixels included in the light emitting area and the maximum value of the brightness value of the pixel included in this light emitting area may be weighted to use a combined value of these weighting results as the brightness value of the light emitting area. Meanwhile, a weight used for weighting is set to increase for the average value when the difference between the average value and the maximum value is greater, and increase for the maximum value when the difference between the average value and the maximum value is lower. According to the characteristics, it is possible to set adequate light emission brightness of backlight with little flickers without overreacting to the maximum value included in the light emitting area.

Further, backlight control section 106 performs filter processing of the brightness value of the light emitting area calculated as described above to make the boundary between adjacent light emitting areas less distinct. More specifically, filter processing is applied to the light emitting area using the two dimensional lowpass filter.

Further, based on the brightness value after filter processing, a control signal for controlling backlight 102 to actually emit light is generated.

Note that the light emission brightness of backlight 102 may be determined using one of various conventionally proposed methods. Based on the brightness value of the pixel in the above light emitting area, the maximum value or average value of R, G and B, or a value blending the maximum value and average value, the light emission brightness of backlight 102 may also be determined per light emitting area. Further, the light emission brightness of the light emitting area may be determined referring to the pixels of the light emitting areas in the surrounding in addition to the pixels in the light emitting area. Further, the light emission brightness may be determined taking into account information about a previous frame or previous field and motion vector. In this case, it is possible to realize local dimming of little flickering of edges and little flickers.

<Backlight Driving Section 107>

Backlight driving section 107 generates a control signal for controlling backlight 102 per light emitting area, based on the control signal output from backlight control section 106, and outputs this control signal to backlight 102.

The operation performed in control section 12 of the image display apparatus to set the transmittance of liquid crystal panel 101 is as described in Embodiment 1 using FIG. 4. Further, the operation performed in control section 12 of the image display apparatus to set the light emission brightness of backlight 102 is as described in Embodiment 1 using FIG. 5.

FIGS. 9A to 9F are views for describing a function and operation of conversion processing of a brightness value according to Embodiment 2. Note that the horizontal axes of FIGS. 9A to 9F are pixels of the video signal which are continuous in the horizontal direction, and divided into five periods BLK 1 to BLK 5 for ease of description. That is, periods BLK 1 to BLK 5 each include a plurality of pixels. The relationship between pixels in a video signal and periods BLK 1 to BLK 5 is as described in Embodiment 1 using FIG. 7. Further, the brightness of backlight 102 is controlled on a per period (BLK) basis.

Figure 9:
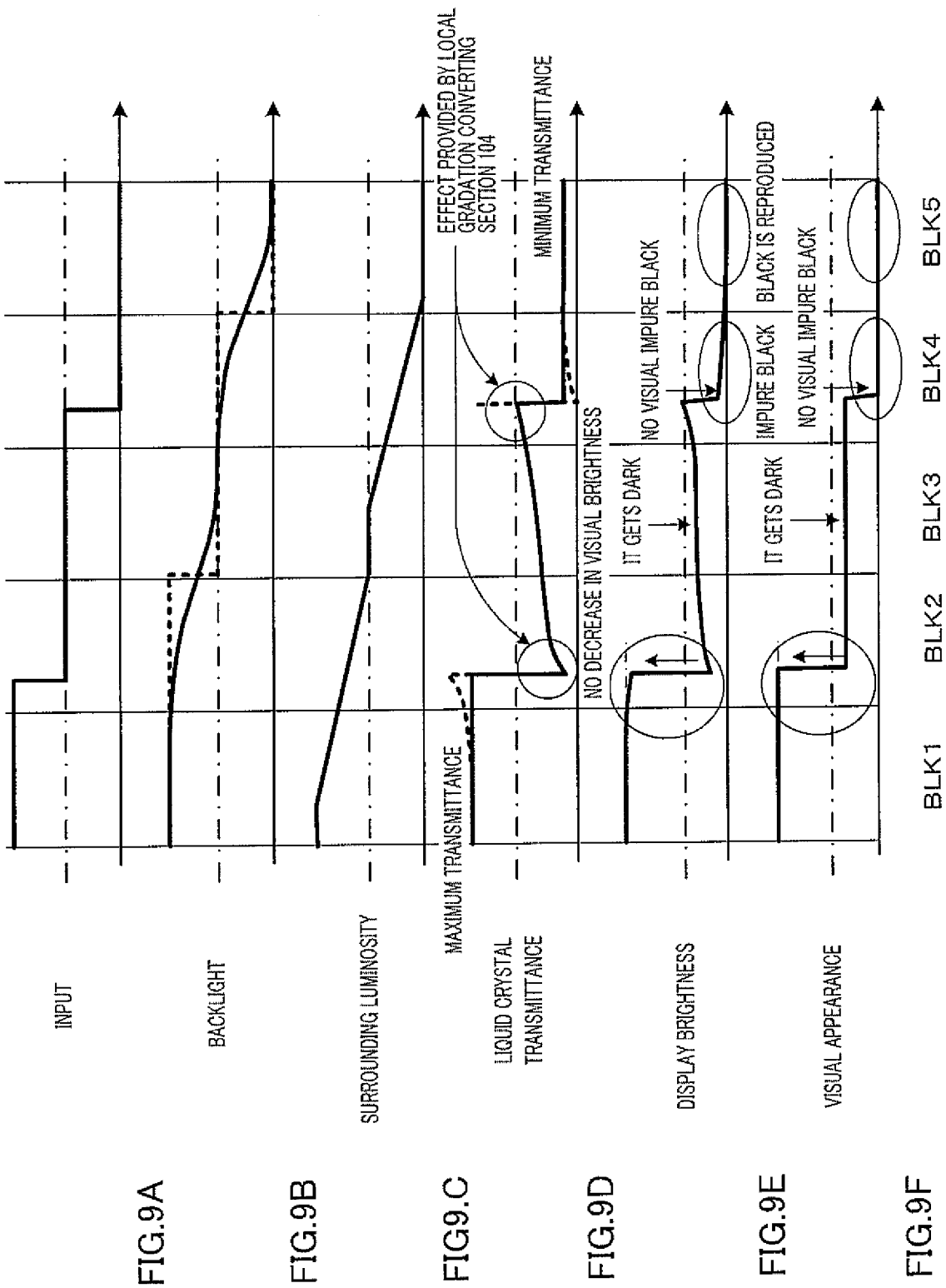
FIG. 9A is a view for describing a function and operation of conversion processing of a brightness value and illustrating the brightness value of an input video signal according to Embodiment 2 of the present invention.
FIG. 9B is a view for describing a function and operation of conversion processing of the brightness value and illustrating the brightness of backlight according to Embodiment 2 of the present invention.
FIG. 9C is a view for describing a function and operation of conversion processing of the brightness value and illustrating a surrounding luminosity according to Embodiment 2 of the present invention.
FIG. 9D is a view for describing a function and operation of conversion processing of the brightness value illustrating a transmittance of a liquid crystal panel according to Embodiment 2 of the present invention.
FIG. 9E is a view for describing a function and operation of conversion processing of the brightness value and illustrating a controlled display brightness in the liquid crystal panel according to Embodiment 2 of the present invention.
FIG. 9F is a view for describing a function and operation of conversion processing of the brightness value and illustrating a visual brightness in the liquid crystal panel according to Embodiment 2 of the present invention.

FIG. 9A is a view illustrating brightness values of pixels of periods BLK 1 to BLK 5 of the input video signal. FIG. 9B is a view illustrating the brightness of backlight 102. FIG. 9C is a view illustrating the surrounding luminosities of pixels in periods BLK 1 to BLK 5 of the input video signal. FIG. 9D is a view illustrating the transmittance of liquid crystal panel 101 defined by the control signal output from liquid crystal panel driving section 105. FIG. 9E is a view illustrating the display brightness controlled in liquid crystal panel 101. FIG. 9F is a view illustrating the visual brightness in liquid crystal panel 101.

In FIG. 9B, the dotted line indicates the light emission brightness of backlight 102 of each light emitting area defined by the control signal output from backlight driving section 107. The solid line indicates the back face brightness of liquid crystal panel 101. That is, although backlight 102 emits illumination light at the brightness determined per period according to a control signal (dotted line in FIG. 9B), the illumination light is diffused by, for example, the function of light diffusion sheet 103. Therefore, when there is a difference in the light emission brightness of backlight 102 between adjacent periods as in, for example, periods BLK 2 and BLK 3, the brightness of illumination light which actually arrives at the back face of liquid crystal panel 101 varies per pixel (solid line in FIG. 9B). Note that unlike Embodiment 1, in Embodiment 2, the back face brightness is not estimated per pixel.

Further, as illustrated in FIG. 9A, when the brightness value of the input video signal is not constant, the surrounding luminosity varies per pixel in the part at which the brightness value changes (for example, period BLK 2) and its surrounding (for example, period BLK 1) (FIG. 9C).

Thus, when there is a difference between the brightness value of a certain pixel and its surrounding luminosity (that is, local contrast), local gradation converting section 104 performs gradation correction (conversion processing of a brightness value) of a pixel (that is, locally) for enhancing the difference using the above gradation conversion characteristics.

It is found upon comparison of FIGS. 9A and 9C that, in the center part of period BLK 2, for example, the brightness value of the pixel is lower than the surrounding luminosity of the pixel. Hence, gradation correction of each pixel in this part is performed to further decrease the brightness, and the transmittance of liquid crystal panel 101 determined based on the corrected brightness value is lower when the surrounding is brighter as surrounded by the circle on the left side in FIG. 9D.

Near, for example, the boundary between periods BLK 1 and BLK 2, the brightness value of the pixel is higher than the surrounding luminosity of the pixel. Hence, gradation correction of each pixel in this part is performed to further increase the brightness value. However, the brightness value of each pixel in this part is already a maximum value within a settable range, and gradation correction for further increasing the brightness value cannot be physically realized even if such gradation correction is possible in terms of calculation. That is, the transmittance of each pixel in this part does not become higher deviating from the range which can be realized in liquid crystal panel 101 (phenomenon indicated by the dotted line in FIG. 9D), and is maintained at a maximum value.

On, for example, the left side part of period BLK 4, the brightness value of the pixel is higher than the surrounding luminosity of the pixel. Hence, gradation correction of each pixel in this part is performed to further increase the brightness, and the transmittance of liquid crystal panel 101 determined based on the corrected brightness value becomes higher when the surrounding is darker as surrounded by the circle on the right side in FIG. 9D.

In, for example, the center part of period BLK 4, the brightness value of the pixel is lower than the surrounding luminosity of the pixel. Hence, gradation correction of each pixel in this part is performed to further decrease the brightness value. However, the brightness value of each pixel in this part is already a minimum value in the settable range, and gradation correction for further decreasing the brightness value cannot be physically realized even if such gradation correction is possible in terms of calculation. That is, the transmittance of each pixel in this part does not become lower deviating from the range which can be realized in liquid crystal panel 101 (phenomenon indicated by the dotted line in FIG. 9D), and is maintained at a minimum value.

The display brightness (FIG. 9E) in liquid crystal panel 101 is a product of the back face brightness (that is, the brightness of illumination light which actually arrives at the back face of liquid crystal panel 101) indicated by the solid line in FIG. 9B and the transmittance indicated by the solid line in FIG. 9D.

Therefore, as illustrated in FIG. 9E, although the brightness at the end of a bright area facing a dark area decreases due to a decrease in the back face brightness in period BLK 2, for example, the brightness at the end of a dark area facing a bright area also decreases in proportion to the decrease according to an effect of gradation correction. In this case, when a decrease in the brightness of the bright area is compensated for according to the effect of the tone contrast produced in the user's visual sense, it is possible to make the user perceive that the brightness of this area is maintained at an original level (maximum value) (an upward arrow in period BLK 2).

Further, although the brightness at the end of a dark area facing a bright area increases due to an increase in the back face brightness in period BLK 4, for example (that is, a phenomenon of impure black occurs), the brightness at the end of the bright area facing the dark area also increases in proportion to the increase according to an effect of gradation correction. In this case, when an increase in the brightness of the dark area is compensated for according to the effect of the tone contrast produced in the user's visual sense, it is possible to make the user perceive that the brightness of this area is maintained at an original level (minimum value) (a downward arrow in period BLK 4).

That is, in an area in which the transmittance cannot be expressed by the physical characteristics, the light emission brightness (FIG. 9E) of liquid crystal panel 101 is set utilizing characteristics of the tone contrast. By this means, it is possible to express (FIG. 9F) the brightness such that the impure black phenomenon is not perceived while maintaining the brightness of the bright part. Note that in the present embodiment, the luminosity at an intermediate level as in BLK 3 is displayed darker than an input signal.

As described above, in Embodiment 2, local gradation converting section 104 can convert the brightness value of the input video signal, according to the gradation conversion characteristics using human visual characteristics. Further, liquid crystal panel driving section 105 generates a control signal for controlling the transmittance of liquid crystal panel 101, based on a conversion result of local gradation converting section 104, and outputs the control signal to liquid crystal panel 101 to control the transmittance. Further, backlight control section 106 can set the brightness value which defines the light emission brightness per light emitting area of backlight 102. Further, backlight driving section 107 generates a control signal for controlling backlight 102 to emit light, based on the brightness value defined per light emitting area, and outputs the control signal to backlight 102 to control the LED of backlight 102 at different light emission brightness per light emitting area.

Particularly, in Embodiment 2, since the brightness value is converted according to the gradation conversion characteristics using the human visual characteristics as described above, it is possible to compensate for image deterioration caused by unevenness in brightness or a partial decrease of contrast due to physical limitations of liquid crystal panel 101, using human visual characteristics.

Embodiment 3

Hereinafter, Embodiment 3 will be described.

In Embodiment 2, the gradation characteristics in dynamic gradation correcting section 202 in local gradation converting section 104 are set based on the straight line connecting the "●" symbols in FIG. 3, that is, a straight line of the inclination 1 passing the origin. This setting provides characteristics of enhancing only local contrast without changing a visual brightness.

However, when local dimming control is performed, a brightness value which varies per light emitting area of backlight 102 is set based on the brightness value of an input video signal. More specifically, a lower brightness value than the brightness value of the input video signal is set.

Therefore, when the transmittance of liquid crystal panel 101 is set based on the brightness value of the input video signal, the brightness value of the light emitting area of backlight 102 is lower, and therefore the brightness value displayed on liquid crystal panel 101 becomes darker than the brightness which actually needs to be displayed.

Hence, features of Embodiment 3 include setting gradation conversion characteristics in dynamic gradation correcting section 202 not only to enhance local contrast of a video signal but also to increase a visual brightness.

When local dimming control is performed by converting a brightness value defined in an input video signal as described above using gradation conversion characteristics of increasing a visual brightness, even if the brightness value in backlight 102 decreases as a result, it is possible to display a video signal at a display brightness close to a display brightness of a video signal which does not cause image deterioration caused by unevenness in brightness or a partial decrease of contrast due to physical limitations of a liquid crystal panel and to which local dimming control is not applied.

Note that Embodiment 3 differs from Embodiment 2 only in gradation conversion characteristics held in dynamic gradation correcting section 202, and the other configurations are the same.

Hereinafter, the gradation conversion characteristics held in dynamic gradation correcting section 202 will be described.

Figure 10:
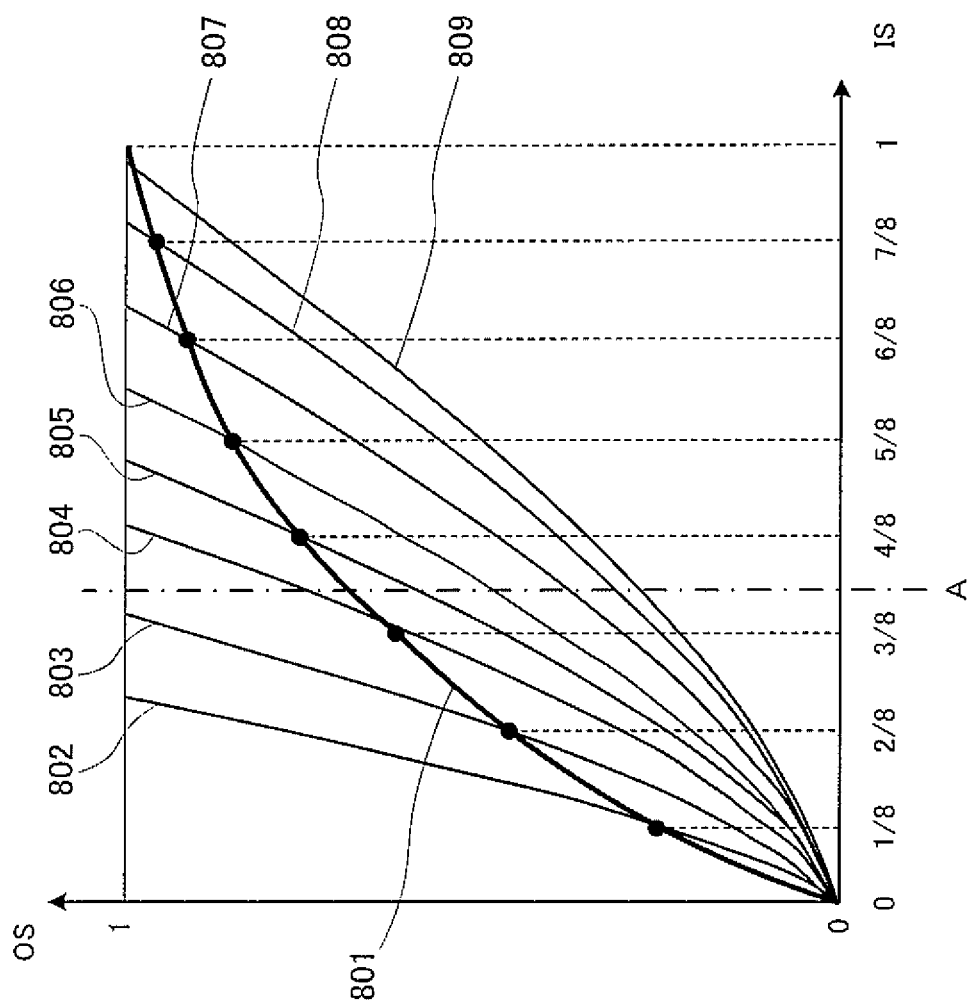
FIG. 10 is a view illustrating gradation conversion characteristics according to Embodiment 3 of the present invention.

FIG. 10 is a view illustrating gradation conversion characteristics according to Embodiment 3.

As described in Embodiment 1, gradation conversion characteristics for each surrounding luminosity US are set based on gradation conversion characteristics of the entire video signal. In Embodiment 3, a visual brightness needs to be increased, and therefore gradation conversion characteristics of the entire video signal are set to curve 801 to come on the upper side of the straight line of the inclination 1 passing the origin as illustrated in FIG. 10. Further, gradation conversion characteristics of each surrounding luminosity US are set between curve 802 and curve 809 based on this curve 801. Note that although FIG. 10 illustrates only eight gradation conversion characteristics for ease of description, it is preferable to set a greater number of gradation conversion characteristics to enable more precise gradation correction.

Further, the gradation conversion characteristic set by dynamic gradation correcting section 202 transitions from curve 809 to curve 802 when surrounding luminosity US becomes lower (darker). That is, if the brightness value of the conversion pixel is fixed, converted brightness value OS becomes higher (brighter) when the surrounding of the conversion pixel becomes darker.

By contrast with this, the gradation conversion characteristic set by dynamic gradation correcting section 202 transitions from curve 802 to curve 809 when surrounding luminosity US becomes higher (brighter). That is, if the brightness value of the conversion pixel is fixed, converted brightness value OS becomes lower (darker) when the surrounding of the conversion pixel becomes brighter.

FIGS. 11A to 11F are views for describing a function and operation of conversion processing of a brightness value according to Embodiment 3. Note that the horizontal axes of FIGS. 11A to 11F are pixels of the video signal which are continuous in the horizontal direction, and divided into five periods BLK 1 to BLK 5 for ease of description. That is, periods BLK 1 to BLK 5 each include a plurality of pixels. The relationship between pixels in a video signal and periods BLK 1 to BLK 5 is as described in Embodiment 1 using FIG. 7. Further, the brightness of backlight 102 is controlled on a per period (BLK) basis.

FIG. 11A is a view illustrating brightness values of pixels of periods BLK 1 to BLK 5 of the input video signal. FIG. 11B is a view illustrating the brightness of backlight 102. FIG. 11C is a view illustrating the surrounding luminosities of pixels in periods BLK 1 to BLK 5 of the input video signal. FIG. 11D is a view illustrating the transmittance of liquid crystal panel 101 defined by the control signal output from liquid crystal panel driving section 105. FIG. 11E is a view illustrating the display brightness controlled in liquid crystal panel 101. FIG. 11F is a view illustrating the visual brightness in liquid crystal panel 101.

In FIG. 11B, the dotted line indicates the light emission brightness of backlight 102 of each light emitting area defined by the control signal output from backlight driving section 107. The solid line indicates the back face brightness of liquid crystal panel 101. That is, although backlight 102 emits illumination light at the brightness determined per period according to a control signal (dotted line in FIG. 11B), the illumination light is diffused by, for example, the function of light diffusion sheet 103. Therefore, when there is a difference in the light emission brightness of backlight 102 between adjacent periods as in, for example, periods BLK 2 and BLK 3, the brightness (back face brightness) of illumination light which actually arrives at the back face of liquid crystal panel 101 varies per pixel (solid line in FIG. 11B). Note that, similar to Embodiment 2, in Embodiment 3, the back face brightness is not estimated per pixel.

Further, as illustrated in FIG. 11A, when the brightness value of the input video signal is not constant, the surrounding luminosity varies per pixel in the part at which the brightness value changes (for example, period BLK 2) and its surrounding (for example, period BLK 1) (FIG. 11C).

Thus, when there is a difference between the brightness value of a certain pixel and its surrounding (that is, local contrast), local gradation converting section 104 performs gradation correction (conversion processing of a brightness value) of a pixel (that is, locally) for enhancing the difference using the above gradation conversion characteristics.

It is found upon comparison of FIGS. 11A and 11C that, in the center part of period BLK 2, for example, the brightness value of the pixel is lower than the surrounding luminosity of the pixel. Hence, gradation correction of each pixel in this part is performed to further decrease the brightness, and the transmittance of liquid crystal panel 101 determined based on the corrected brightness value is lower when the surrounding is brighter as surrounded by the circle on the left side in FIG. 11D.

Near, for example, the boundary between periods BLK 1 and BLK 2, the brightness value of the pixel is higher than the surrounding luminosity of the pixel. Hence, gradation correction of each pixel in this part is performed to further increase the brightness value. However, the brightness value of each pixel in this part is already a maximum value within a settable range, and gradation correction for further increasing the brightness value cannot be physically realized even if such gradation correction is possible in terms of calculation. That is, the transmittance of each pixel in this part does not become higher deviating from the range which can be realized in liquid crystal panel 101 (phenomenon indicated by the dotted line in FIG. 11D), and is maintained at a maximum value.

On, for example, the left side part of period BLK 4, the brightness value of the pixel is higher than the surrounding luminosity of the pixel. Hence, gradation correction of each pixel in this part is performed to further increase the brightness, and the transmittance of liquid crystal panel 101 determined based on the corrected brightness value becomes higher when the surrounding is darker as surrounded by the circle on the right side in FIG. 11D.

In, for example, the center part of period BLK 4, the brightness value of the pixel is lower than the surrounding luminosity of the pixel. Hence, gradation correction of each pixel in this part is performed to further decrease the brightness value. However, the brightness value of each pixel in this part is already a minimum value in the settable range, and gradation correction for further decreasing the brightness value cannot be physically realized even if such gradation correction is possible in terms of calculation. That is, the transmittance of each pixel in this part does not become lower deviating from the range which can be realized in liquid crystal panel 101 (phenomenon indicated by the dotted line in FIG. 11D), and is maintained at a minimum value.

Further, in Embodiment 3, characteristics of increasing a brightness value of a halftone are set in the gradation conversion characteristics, so that, without recorrecting the brightness value based on the estimation value of the back face brightness, it is possible to increase the transmittance (FIG. 11D) of liquid crystal panel 101 entirely in a half-tone area.

The display brightness (FIG. 11E) in liquid crystal panel 101 is a product of the back face brightness indicated by the solid line in FIG. 11B and the transmittance indicated by the solid line in FIG. 11D.

Therefore, as illustrated in FIG. 11E, although the brightness at the end of a bright area facing a dark area decreases due to a decrease in the back face brightness in period BLK 2, for example, the brightness at the end of a dark area facing a bright area also decreases in proportion to the decrease according to an effect of gradation correction. In this case, when a decrease in the brightness of the bright area is compensated for according to the effect of the tone contrast produced in the user's visual sense, it is possible to make the user perceive that the brightness of this area is maintained at an original level (maximum value) (an upward arrow in period BLK 2).

Further, although the brightness at the end of a dark area facing a bright area increases due to an increase in the back face brightness in period BLK 4, for example (that is, a phenomenon of impure black occurs), the brightness at the end of the bright area facing the dark area also increases in proportion to the increase according to an effect of gradation correction. In this case, when an increase in the brightness of the dark area is compensated for according to the effect of the tone contrast produced in the user's visual sense, it is possible to make the user perceive that the brightness of this area is maintained at an original level (minimum value) (a downward arrow in period BLK 4).

That is, in an area in which the transmittance cannot be expressed by the physical characteristics, the light emission brightness (FIG. 11E) of liquid crystal panel 101 is set utilizing characteristics of the tone contrast. By this means, it is possible to express (FIG. 11F) the brightness such that the impure black phenomenon is not perceived while maintaining the brightness of the bright part.

Further, by setting in the gradation conversion characteristics the characteristics of increasing the brightness value of the halftone, it is possible to compensate for a decrease in the brightness due to local dimming control and, consequently, realize the display brightness of liquid crystal panel 101 equal to the brightness value of the input video signal.

As described above, in Embodiment 3, the gradation conversion characteristics of increasing a visual brightness of the entire video signal and brightening a halftone are set in dynamic gradation correcting section 202. By this means, even when local dimming control is performed and, as a result, the brightness value in backlight 102 decreases, it is possible to display a video signal at a display brightness close to a display brightness of a video signal which does not cause image deterioration caused by unevenness in brightness or a partial decrease of contrast due to physical limitations of a liquid crystal panel and to which local dimming control is not applied. In other words, in Embodiment 3, it is possible to realize the same function and operation as in Embodiment 1 without estimating the back face brightness of backlight 102 and recorrecting the brightness value based on the estimation result as in Embodiment 1.

Embodiment 4

Hereinafter, Embodiment 4 will be described.

When local dimming control is performed, as described in Embodiment 3, a brightness value displayed on liquid crystal panel 101 generally becomes darker than a brightness which needs to be actually displayed.

To solve this problem, features of Embodiment 4 are that dynamic gradation correcting section 202 uses gradation conversion characteristics of increasing a brightness value of a halftone of a video signal, and backlight control section 106 uses corrected brightness value OS which is an output result of local gradation converting section 104.

According to the above configuration, it is possible to compensate for the brightness value of a halftone which becomes dark due to local dimming control.

Hereinafter, Embodiment 4 will be described with reference to the drawings.

Figure 12:
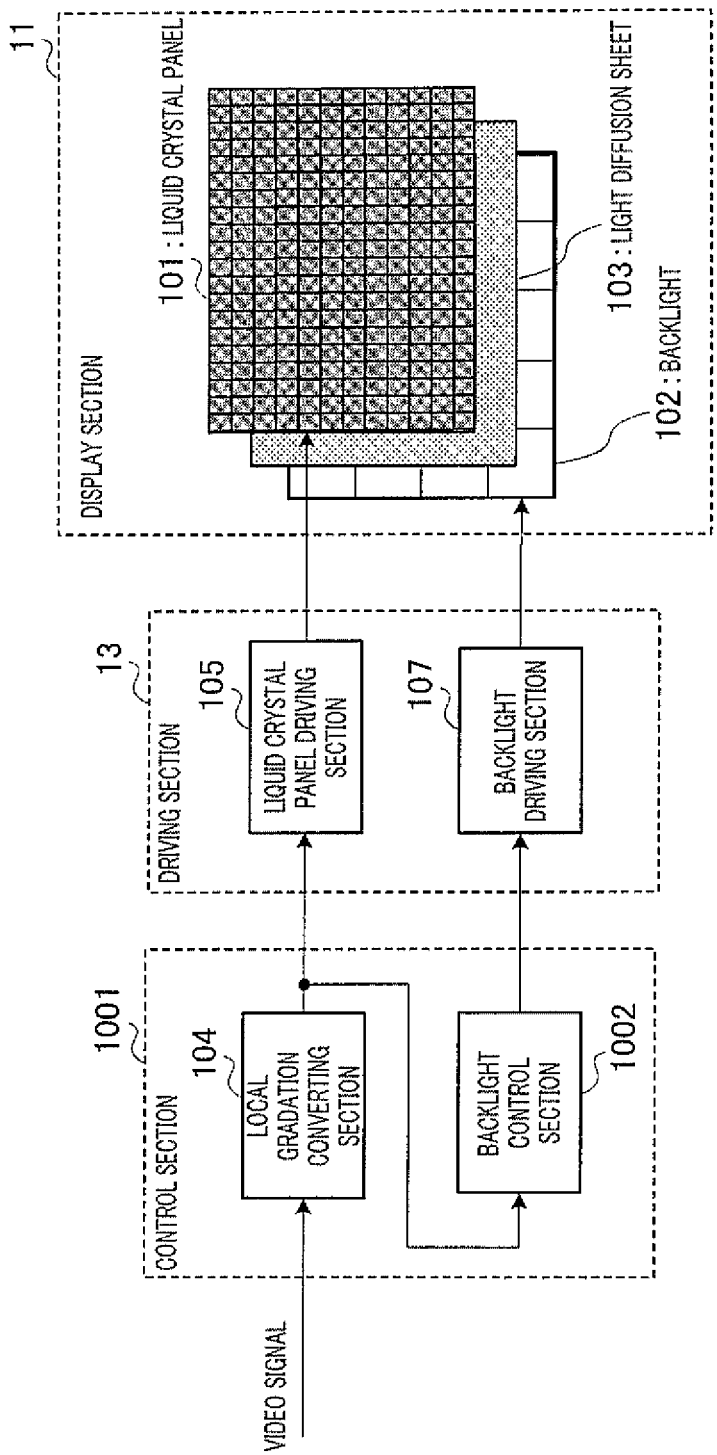
FIG. 12 is a block diagram illustrating a configuration of an image converting apparatus according to Embodiment 4 of the present invention.

FIG. 12 is a block diagram illustrating a configuration of an image converting apparatus according to Embodiment 4.

Control section 1001 of the image converting apparatus according to Embodiment 4 has backlight control section 1002 instead of backlight control section 106.

Note that the same components as those in Embodiments 1 and 2 will be assigned the same reference numerals, and will not be described in detail.

Backlight control section 1002 generates a control signal which defines the light emission brightness of backlight 102 per light emitting area of backlight 102 based on the corrected brightness value output from local gradation converting section 104, and outputs this control signal to backlight driving section 107. The other operations are the same as in Embodiments 1 and 2.

FIGS. 13A to 13F are views for describing a function and operation of conversion processing of a brightness value according to Embodiment 4. Note that the horizontal axes of FIGS. 13A to 13F are pixels of the video signal which are continuous in the horizontal direction, and divided into five periods BLK 1 to BLK 5 for ease of description. That is, periods BLK 1 to BLK 5 each include a plurality of pixels. The relationship between pixels in a video signal and periods BLK 1 to BLK 5 is as described in Embodiment 1 using FIG. 7. Further, the brightness of backlight 102 is controlled on a per period (BLK) basis.

FIG. 13A is a view illustrating brightness values of pixels of periods BLK 1 to BLK 5 of the input video signal. FIG. 13B is a view illustrating the brightness of backlight 102. FIG. 13C is a view illustrating the surrounding luminosities of pixels in periods BLK 1 to BLK 5 of the input video signal. FIG. 13D is a view illustrating the transmittance of liquid crystal panel 101 defined by the control signal output from liquid crystal panel driving section 105. FIG. 13E is a view illustrating the display brightness controlled in liquid crystal panel 101. FIG. 13F is a view illustrating the visual brightness in liquid crystal panel 101.

In FIG. 13A, the dotted line indicates the brightness value (the brightness value before converted in local gradation converting section 104) of a video signal input in control section 12, and the solid line indicates the brightness value after input in control section 12 and converted in local gradation converting section 104. That is, in Embodiment 4, the brightness value input in backlight control section 1002 is a converted brightness value indicated by the solid line in FIG. 13A.

In FIG. 13B, the dotted line indicates the light emission brightness of backlight 102 of each light emitting area defined by the control signal output from backlight driving section 107. The converted brightness value indicated by the solid line in FIG. 13A is input in backlight control section 1002, and therefore the light emission brightness of backlight 102 is higher compared to a case where the brightness value which is indicated by the dotted line in FIG. 13 and not yet converted is input.

In FIG. 13B, the solid line indicates the back face brightness of liquid crystal panel 101. That is, although backlight 102 emits illumination light at the brightness determined per period according to a control signal (dotted line in FIG. 13B), the illumination light is diffused by, for example, the function of light diffusion sheet 103. Therefore, when there is a difference in the light emission brightness of backlight 102 between adjacent periods as in, for example, periods BLK 2 and BLK 3, the brightness (back face brightness) of illumination light which actually arrives at the back face of liquid crystal panel 101 varies per pixel (solid line in FIG. 13B). Note that similar to Embodiments 2 and 3, in Embodiment 4, the back face brightness is not estimated per pixel.

Further, as illustrated in FIG. 13A, when the brightness value of the input video signal in control section 12 is not constant, the surrounding luminosity varies per pixel in the part at which the brightness value changes (for example, period BLK 2) and its surrounding (for example, period BLK 1) (FIG. 13C).

Thus, when there is a difference between the brightness value of a certain pixel and its surrounding (that is, local contrast), local gradation converting section 104 performs gradation correction (conversion processing of a brightness value) of a pixel (that is, locally) for enhancing the difference using the above gradation conversion characteristics.

It is found upon comparison of FIGS. 13A and 13C that, in the center part of period BLK 2, for example, the brightness value of the pixel is lower than the surrounding luminosity of the pixel. Hence, gradation correction of each pixel in this part is performed to further decrease the brightness value as surrounded by the circle on the left side in FIG. 13A. Further, the transmittance of liquid crystal panel 101 determined based on the corrected brightness value is lower when the surrounding is brighter as surrounded by the circle on the left side in FIG. 13D.

Near, for example, the boundary between periods BLK 1 and BLK 2, the brightness value of the pixel is higher than the surrounding luminosity of the pixel. Hence, gradation correction of each pixel in this part is performed to further increase the brightness value. However, the brightness value of each pixel in this part is already a maximum value within a settable range, and gradation correction for further increasing the brightness value cannot be physically realized even if such gradation correction is possible in terms of calculation. That is, the transmittance of each pixel in this part does not become higher deviating from the range which can be realized in liquid crystal panel 101 (phenomenon indicated by the dotted line in FIG. 13D), and is maintained at a maximum value.

On, for example, the left side part of period BLK 4, the brightness value of the pixel is higher than the surrounding luminosity of the pixel. Hence, gradation correction of each pixel in this part is performed to further increase the brightness value as surrounded by the circle on the right side in FIG. 13A. Further, the transmittance of liquid crystal panel 101 determined based on the corrected brightness value becomes higher when the surrounding is darker as surrounded by the circle on the right side in FIG. 13D.

In, for example, the center part of period BLK 4, the brightness value of the pixel is lower than the surrounding luminosity of the pixel. Hence, gradation correction of each pixel in this part is performed to further decrease the brightness value. However, the brightness value of each pixel in this part is already a minimum value in the settable range, and gradation correction for further decreasing the brightness value cannot be physically realized even if such gradation correction is possible in terms of calculation. That is, the transmittance of each pixel in this part does not become lower deviating from the range which can be realized in liquid crystal panel 101 (phenomenon indicated by the dotted line in FIG. 13D), and is maintained at a minimum value.

Further, in Embodiment 4, characteristics of increasing a brightness value of a halftone are set in the gradation conversion characteristics, so that, without recorrecting the brightness value based on the estimation value of the back face brightness, it is possible to increase the transmittance (FIG. 13D) of liquid crystal panel 101 entirely in a half-tone area.

The display brightness (FIG. 13E) in liquid crystal panel 101 is a product of the back face brightness indicated by the solid line in FIG. 13B and the transmittance indicated by the solid line in FIG. 13D.

Therefore, as illustrated in FIG. 13E, although the brightness at the end of a bright area facing a dark area decreases due to a decrease in the back face brightness in period BLK 2, for example, the brightness at the end of a dark area facing a bright area also decreases in proportion to the decrease according to an effect of gradation correction. In this case, when a decrease in the brightness of the bright area is compensated for according to the effect of the tone contrast produced in the user's visual sense, it is possible to make the user perceive that the brightness of this area is maintained at an original level (maximum value) (an upward arrow in period BLK 2).

Further, although the brightness at the end of a dark area facing a bright area increases due to an increase in the back face brightness in period BLK 4, for example (that is, a phenomenon of impure black occurs), the brightness at the end of the bright area facing the dark area also increases in proportion to the increase according to an effect of gradation correction. In this case, when an increase in the brightness of the dark area is compensated for according to the effect of the tone contrast produced in the user's visual sense, it is possible to make the user perceive that the brightness of this area is maintained at an original level (minimum value) (a downward arrow in period BLK 4).

That is, in an area in which the transmittance cannot be expressed by the physical characteristics, the light emission brightness (FIG. 13E) of liquid crystal panel 101 is set utilizing characteristics of the tone contrast. By this means, it is possible to express (FIG. 13F) the brightness such that the impure black phenomenon is not perceived while maintaining the brightness of the bright part.

Further, by setting in the gradation conversion characteristics the characteristics of increasing the brightness value of the halftone, it is possible to compensate for a decrease in the brightness due to local dimming control and, consequently, realize the display brightness of liquid crystal panel 101 equal to the brightness value of the input video signal.

Note that in Embodiment 4, backlight control section 1002 sets the light emission brightness of backlight 102 using the corrected brightness value, and consequently, characteristics which are set in the gradation conversion characteristics and increase the brightness of a halftone may be more moderate than the characteristics described using FIG. 8.

Embodiments of the present invention have been described above.

Note that the above embodiments may be variously changed and implemented in, for example, an adequate combination with another embodiment.

Further, although the above embodiments have been described for ease of description assuming that an input video signal is a brightness without taking into account a color in particular, the present invention is by no means limited to monochrome and is naturally applicable to color.

Further, when R, G and B of backlight 102 are independently controlled, a video signal may be replaced with an R signal, a G signal and a B signal to independently control three channels.

Further, when back light uses white and only the brightness of white is controlled, R, G and B of a color image may be converted into brightness/color-difference signal to perform the same processing with respect to a brightness signal. Further, it is also possible to use, for example, a maximum value of R, G and B instead of a brightness signal, which provides a special effect of preventing color saturation.

Further, although the above embodiments have been described using the liquid crystal display apparatus as an example, the present invention is by no means limited to this. The present invention is also applicable to other image display apparatuses such as a projector as long as the devices can, like a liquid crystal and a digital mirror device (DMD), vary the transmittance or reflectivity and use a light source which enables local dimming.

Further, the above embodiments have been described using as an example a configuration of calculating surrounding luminosity US based on brightness values of pixels disposed in the surrounding of a conversion pixel and setting the gradation conversion characteristics based on surrounding luminosity US. However, the configuration of the present invention is not limited to this, and the present invention may be configured to, for example, generate a histogram based on brightness values of pixels disposed in the surrounding of the conversion pixel, and set the gradation conversion characteristics in the dynamic gradation correcting section based on the shape of the histogram.

The disclosure of Japanese Patent Application No. 2009-223980, filed on Sep. 29, 2009, including the specification, drawings and abstract, is incorporated herein by reference in its entirety.

INDUSTRIAL APPLICABILITY

The display apparatus and the display method according to the present invention provide an effect of compensating for image deterioration caused by unevenness in brightness or a partial decrease of contrast due to physical limitations of a display device, in a local dimming technique, and are useful for image display apparatuses such as liquid crystal display apparatuses.

REFERENCE SIGNS LIST

11 Display section
12, 1001 Control section
13 Driving section
14 Light amount estimating section
15 Video correcting section
101 Liquid crystal panel
102 Backlight
103 Light diffusion sheet
104 Local gradation converting section
105 Liquid crystal panel driving section
106, 1002 Backlight control section
107 Backlight driving section
201 Surrounding luminosity detecting section
202 Dynamic gradation correcting section
301, 302, 303, 304, 305, 306, 307, 308, 801, 802, 803, 804, 805, 806, 807, 808, 809 Gradation conversion characteristics

The invention claimed is:

1. A display apparatus comprising:
a light modulating section which modulates illumination light according to a light modulation coefficient and displays an image on a screen;
a radiating section which radiates the illumination light on the light modulating section with an illumination light amount which varies per light emitting area of the screen;
a control section that receives a video signal and which controls light emission brightness of the radiating section per light emitting area based on a control signal output by the control section;
a video correcting section which corrects the video signal based on a light amount of illumination light which arrives at the light modulating section;
a converting section separate from the control section and that receives the video signal and which applies individual gradation conversion processing on each pixel of the video signal and acquires a converted brightness value per pixel; and
a first driving section which controls the light modulation coefficient per pixel based on the acquired converted brightness value,
the control signal output by the control section is not input into the converting section,
wherein for each processing target pixel in the video signal, the converting section sets conversion characteristics of decreasing a brightness value of each processing target pixel when a luminosity in a surrounding area of each processing target pixel is higher, the surrounding area being a part of area in the video signal, and performs gradation conversion using the set conversion characteristics.

2. The display apparatus according to claim 1, wherein the converting section detects average luminosity in the surrounding area of each processing target pixel as the luminosity in the surrounding area of each processing target pixel.

3. The display apparatus according to claim 1, wherein the conversion characteristics include characteristics of making no change of a brightness value equal to the luminosity in the surrounding area of each processing target pixel.

4. The display apparatus according to claim 1, wherein the conversion characteristics include characteristics of increasing a brightness value of a halftone.

5. The display apparatus according to claim 1, wherein the control section controls light emission brightness of the radiating section per light emitting area based on the acquired converted brightness value.

6. The display apparatus according to claim 1, wherein the converting section performs gradation conversion to decrease a brightness value of a processing target pixel positioned near a pixel where the light modulation coefficient is a maximum value in a range which can be realized by the light modulating section.

7. The display apparatus according to claim 1, wherein the converting section performs gradation conversion to increase a brightness value of a processing target pixel positioned near a pixel where the light modulation coefficient is a minimum value in a range which can be realized by the light modulating section.

8. A display apparatus comprising:
a light modulating section which modulates illumination light according to a light modulation coefficient and displays an image on a screen;
a radiating section which radiates the illumination light on the light modulating section with an illumination light amount which varies per light emitting area of the screen;
a control section that receives a video signal and which controls light emission brightness of the radiating section per light emitting area based on a control signal output by the control section;
a video correcting section which corrects the video signal based on a light amount of illumination light which arrives at the light modulating section;
a converting section separate from the control section and that receives the video signal and which applies individual gradation conversion processing on each pixel of the video signal and acquires a converted brightness value per pixel; and
a first driving section which controls the light modulation coefficient per pixel based on the acquired converted brightness value,
the control signal output by the control section is not input into the converting section,
wherein for each processing target pixel in the video signal, the converting section performs gradation conversion of enhancing local contrast using conversion characteristics of decreasing a brightness value of each processing target pixel when a luminosity in a surrounding area of each processing target pixel is higher, the surrounding area being a part of area in the video signal.

9. A display method comprising:
a light modulating step of modulating illumination light according to a light modulation coefficient and displaying an image on a screen;
a radiating step of radiating the illumination light on a light modulating section with an illumination light amount which varies per light emitting area of the screen;
a control step of receiving a video signal and controlling a light emission brightness in the radiating section per light emitting area based on a control signal;
a video correcting step of correcting the video signal based on a light amount of illumination light which arrives at the light modulating section;
a converting step, separate from the control step, of receiving the video signal and applying individual gradation conversion processing on each pixel of the video signal and acquiring a converted brightness value per pixel; and a first driving step of controlling the light modulation coefficient per pixel based on the acquired converted brightness value, the control signal is not used in the converting step to acquire the converted brightness value, wherein for each processing target pixel in the video signal, the converting step performs gradation conversion of enhancing local contrast using conversion characteristics of decreasing a brightness value of each processing target pixel when a luminosity in a surrounding area of each processing target pixel is higher, the surrounding area being a part of area in the video signal.

10. A display method comprising:

a light modulating step of modulating illumination light according to a light modulation coefficient and displaying an image on a screen;

a radiating step of radiating the illumination light on a light modulating section with an illumination light amount which varies per light emitting area of the screen;

a control step of receiving a video signal and controlling a light emission brightness in the radiating section per light emitting area based on a control signal;

a video correcting step of correcting the video signal based on a light amount of illumination light which arrives at the light modulating section;

a converting step, separate from the control step, of receiving the video signal and applying individual gradation conversion processing on each pixel of the video signal and acquiring a converted brightness value per pixel; and a first driving step of controlling the light modulation coefficient per pixel based on the acquired converted brightness value, the control signal is not used in the converting step to acquire the converted brightness value, wherein for each processing target pixel in the video signal, the converting step performs gradation conversion of enhancing local contrast using conversion characteristics of decreasing a brightness value of each processing target pixel when a luminosity in a surrounding area of each processing target pixel is higher, the surrounding area being a part of area in the video signal.

11. The display apparatus according to claim 1, further comprising a second driving section that receives the control signal output from the control section and that controls the light emission brightness of the radiating section per light emitting area.

12. The display apparatus of claim 8, further comprising a second driving section that receives the control signal output from the control section and that controls the light emission brightness of the radiating section per light emitting area.

13. The display method of claim 9, further comprising a second driving step of receiving the control signal and controlling the light emission brightness in the radiating section per light emitting area based on the control signal.

14. The display method of claim 10, further comprising a second driving step of receiving the control signal and controlling the light emission brightness in the radiating section per light emitting area based on the control signal.

* * * * *